(12) United States Patent
Fu

(10) Patent No.: US 12,212,619 B2
(45) Date of Patent: Jan. 28, 2025

(54) TERMINAL DEVICE INTERACTION METHOD AND APPARATUS

(71) Applicant: HUAWEI TECHNOLOGIES CO., LTD., Guangdong (CN)

(72) Inventor: Peng Fu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/190,964

(22) Filed: Mar. 27, 2023

(65) Prior Publication Data

US 2023/0247085 A1 Aug. 3, 2023

Related U.S. Application Data

(63) Continuation of application No. PCT/CN2021/119656, filed on Sep. 22, 2021.

(30) Foreign Application Priority Data

Sep. 30, 2020 (CN) .......................... 202011063107.2

(51) Int. Cl.
G06F 3/0484 (2022.01)
G06F 3/04817 (2022.01)
G06F 15/00 (2006.01)
G06F 16/16 (2019.01)
H04L 67/06 (2022.01)

(52) U.S. Cl.
CPC .......... H04L 67/06 (2013.01); G06F 3/04817 (2013.01)

(58) Field of Classification Search
None
See application file for complete search history.

(56) References Cited

U.S. PATENT DOCUMENTS

| | | | |
|---|---|---|---|
| 2013/0086214 A1* | 4/2013 | Jung | H04L 67/1095 709/217 |
| 2014/0059129 A1* | 2/2014 | Chumbley | G06F 16/955 709/204 |
| 2014/0087654 A1* | 3/2014 | Kiveisha | H04B 5/72 455/41.1 |
| 2014/0136986 A1* | 5/2014 | Martin | G06F 3/0485 715/748 |
| 2016/0088480 A1 | 3/2016 | Chen et al. | |

FOREIGN PATENT DOCUMENTS

| | | |
|---|---|---|
| CN | 109951424 A | 6/2019 |
| EP | 3232731 A1 | 10/2017 |

\* cited by examiner

*Primary Examiner* — Nicholas R Taylor
*Assistant Examiner* — Ho T Shiu

(57) ABSTRACT

A terminal device interaction method and apparatus are disclosed. In the method, a first terminal device receives a first sharing operation for a first common application APP (S11), the first terminal device transmits a first sharing instruction based on the first sharing operation (S12), and the first terminal device receives and displays information about first data transmitted by a second terminal device (S13); the first terminal device transmits a second sharing instruction (S14); and the first terminal device receives first target data that is transmitted by the second terminal device based on the second sharing instruction (S15).

19 Claims, 11 Drawing Sheets

TERMINAL DEVICE INTERACTION METHOD AND APPARATUS

CROSS-REFERENCE TO RELATED APPLICATIONS

This application is a continuation of International Application No. PCT/CN2021/119656, filed on Sep. 22, 2021, which claims priority to Chinese Patent Application No. 202011063107.2, filed on Sep. 30, 2020. The disclosures of the aforementioned applications are hereby incorporated by reference in their entireties.

TECHNICAL FIELD

This application relates to the field of terminal device technologies, and specifically, to a terminal device interaction method and apparatus.

BACKGROUND

With development of interaction technologies and communication technologies of terminal devices, scenarios in which multi-screen collaboration is performed between a plurality of terminal devices are increasingly diversified. For example, currently, multi-screen collaboration between a plurality of terminal devices such as a mobile phone, a tablet computer, and a television set may be implemented. By using a multi-screen collaboration technology, a display of a terminal device may display an interface of a peer terminal device, so as to meet a requirement of a user for viewing the interface of the peer terminal device.

Further, in some scenarios, a terminal device further needs to perform data interaction with another terminal device, so as to implement data sharing between different terminal devices. To meet this requirement, a terminal device interaction method is currently provided. Two terminal devices that perform data interaction by using the method need to install a same application (APP), and shared data is data of the APP. It is assumed that the two terminal devices are a first terminal device and a second terminal device, and the first terminal device needs to obtain data of the second terminal device. In this method, the second terminal device needs to log in to cloud storage software by using an account, and upload the data that needs to be shared to the cloud storage software, and then the first terminal device logs in to the cloud storage software by using the same account, and downloads, by using the software, the data that needs to be shared.

However, in this method, two terminal devices that need to perform data interaction log in to the cloud storage software by using a same account in sequence; after logging in to the cloud storage software, the first terminal device further needs to search for and upload the data that needs to be shared; and after logging in to the cloud storage software, the second terminal device needs to search for and download data from the software. The operations are complex, and data interaction efficiency is low.

SUMMARY

In an existing terminal device interaction technology, there are problems of complex operations and low data interaction efficiency. To resolve this problem, embodiments of this application provide a terminal device interaction method and apparatus.

According to a first aspect, an embodiment of this application discloses a terminal device interaction method, including:

a first terminal device receives a first sharing operation for a first common application APP, where an APP installed in both the first terminal device and a second terminal device is a common APP;

the first terminal device transmits a first sharing instruction based on the first sharing operation, where the first sharing instruction is used to indicate that the first terminal device needs to share data of the first common APP in the second terminal device;

the first terminal device receives and displays information about first data transmitted by the second terminal device, where the first data is data that is in the first common APP in the second terminal device and that can be shared with the first terminal device;

after receiving a second sharing operation for information about first target data, the first terminal device transmits a second sharing instruction, where the first target data is data in the first data, and the second sharing instruction is used to instruct to share the first target data; and the first terminal device receives the first target data that is transmitted by the second terminal device based on the second sharing instruction.

According to the foregoing solution, a user only needs to perform the first sharing operation on the first common APP displayed on the first terminal device, and perform the second sharing operation on the information about the first data displayed on the first terminal device, so that the first terminal device can obtain the first target data in the second terminal device, thereby implementing data interaction. The operations are simple and convenient, and the data interaction efficiency is high.

In an optional design, the method further includes:
the first terminal device determines a common APP in APPs installed in the first terminal device; and
the first terminal device highlights an icon of the common APP included in a screen of the first terminal device.

According to the foregoing solution, the first terminal device determines the common APP, and highlights the common APP on the screen of the first terminal device, so that the user of the first terminal device identifies the common APP and a differentiated APP, and further, the user can easily perform a corresponding sharing operation on the identified common APP. Therefore, it is convenient to implement data sharing between different terminal devices, and user experience is effectively improved.

In an optional design, that the first terminal device determines a common APP in APPs installed in the first terminal device includes:

the first terminal device obtains desktop layout data of the second terminal device, where the desktop layout data of the second terminal device is used to indicate an installation package of an APP installed in the second terminal device; and if an operating system of the first terminal device is the same as that of the second terminal device, the first terminal device determines the common APP based on a name of an installation package of an APP installed in the first terminal device and a name of an installation package of an APP installed in the second terminal device, where an APP indicated by installation packages with a same name is the common APP.

In an optional design, the first sharing operation includes an operation for a first icon, where the first icon is an icon of the first common APP installed in the first terminal device; or the screen of the first terminal device includes a first area and a second area, the first area is an area for displaying an interface of the second terminal device, the second area is an area other than the first area, the first sharing operation includes an operation for a second icon, and the second icon is an icon of the first common APP in the first area.

In an optional design, the operation for the second icon is a drag operation for the second icon, where the drag operation for the second icon is used to drag the first icon to the second area.

In an optional design, the method further includes:

after receiving the first sharing operation, the first terminal device displays a first selection box, where the first selection box is used to indicate whether to share the data of the second terminal device with the first terminal device; and after receiving a confirmation operation for the first selection box, the first terminal device transmits the first sharing instruction.

According to the foregoing solution, the first terminal device transmits the first sharing instruction after receiving the confirmation operation for the first selection box, thereby effectively avoiding a misoperation.

In an optional design, the method further includes:

the first terminal device receives a third sharing operation for a second common APP, where the third sharing operation is used to instruct to share data of the second common APP in the first terminal device with the second terminal device;

the first terminal device displays information about second data of the second common APP installed in the first terminal device, where the second data is data that is in the second common APP in the first terminal device and that can be shared with the second terminal device; and after receiving a fourth sharing operation, the first terminal device transmits, to the second terminal device, second target data indicated by the fourth sharing operation, where the second target data belongs to the second data.

According to the foregoing solution, the first terminal device may further transmit, to the second terminal device, the second target data of the second common APP installed in the first terminal device, so as to implement sharing of the second target data between the first terminal device and the second terminal device.

In an optional design, the third sharing operation includes an operation for a third icon, where the third icon is an icon of the second common APP installed in the first terminal device.

In an optional design, if the screen of the first terminal device includes a first area and a second area, where the first area is an area for displaying an interface of the second terminal device and the second area is an area other than the first area, the third sharing operation is a drag operation for the third icon, and the drag operation for the third icon is used to drag the third icon to the first area.

In an optional design, the method further includes:

if the screen of the first terminal device includes a first area and a second area, where the first area is an area for displaying an interface of the second terminal device and the second area is an area other than the first area on the screen, after receiving a selection operation for a third common APP in the first area, the first terminal device displays a second selection box, where the second selection box is used to indicate whether to start the third common APP installed in the first terminal device; and after receiving a confirmation operation for the second selection box, the first terminal device runs the third common APP installed in the first terminal device.

According to the foregoing solution, after receiving the selection operation for the third common APP in the first area, the first terminal device can run the third common APP installed in the first terminal device, thereby improving user experience.

In an optional design, the method further includes:

after receiving a negative operation for the second selection box, the first terminal device transmits a first running instruction to the second terminal device, where the first running instruction is used to instruct the second terminal device to run the third common APP installed in the second terminal device.

In an optional design, the method further includes:

after receiving the first target data, the first terminal device synchronizes the first target data to the first common APP in the first terminal device.

According to the foregoing solution, the first terminal device may apply and view the first target data by using the first common APP installed in the first terminal device.

According to a second aspect, an embodiment of this application provides a terminal device interaction method, including a second terminal device receives a first sharing instruction transmitted by a first terminal device, where the first sharing instruction is used to indicate that the first terminal device needs to share data of a first common APP in the second terminal device, and an APP installed in both the first terminal device and the second terminal device is a common APP;

the second terminal device transmits information about first data corresponding to the first sharing instruction, where the first data is data that is in the first common APP in the second terminal device and that can be shared with the first terminal device;

the second terminal device receives a second sharing instruction, where the second sharing instruction indicates that the first terminal device needs to share first target data in the first data; and the second terminal device transmits the first target data.

In an optional design, the method further includes:

the second terminal device determines a common APP in APPs installed in the second terminal device; and the second terminal device highlights an icon of the common APP included in a screen of the second terminal device.

In an optional design, the method further includes:

the second terminal device receives second target data, where the second target data belongs to second data, and the second data is data that is in a second common APP in the first terminal device and that can be shared with the second terminal device.

In an optional design, the method further includes: after receiving a first running instruction, the second terminal device runs a third common APP installed in the second terminal device.

According to a third aspect, an embodiment of this application provides a terminal device interaction apparatus, applied to a first terminal device and including:

a transceiver interface and a processor, where
the transceiver interface is configured to receive a first sharing operation for a first common application APP, where an APP installed in both the first terminal device and a second terminal device is a common APP;
the processor is configured to determine a first sharing instruction based on the first sharing operation, where the first sharing instruction is used to indicate that the first terminal device needs to share data of the first common APP in the second terminal device;
the transceiver interface is further configured to: transmit the first sharing instruction, and receive information about first data transmitted by the second terminal device, where the first data is data that is in the first common APP in the second terminal device and that can be shared with the first terminal device; and
the processor is further configured to display the information about the first data; and
the transceiver interface is further configured to: after receiving a second sharing operation for information about first target data, transmit, by the first terminal device, a second sharing instruction, where the first target data is data in the first data, and the second sharing instruction is used to instruct to share the first target data; and receive the first target data that is transmitted by the second terminal device based on the second sharing instruction.

In an optional design, the processor is further configured to: determine a common APP in APPs installed in the apparatus, and highlight an icon of the common APP included in a screen of the apparatus.

In an optional design, the first sharing operation includes an operation for a first icon, where the first icon is an icon of the first common APP installed in the first terminal device;

or, the screen of the first terminal device includes a first area and a second area, the first area is an area for displaying an interface of the second terminal device, the second area is an area other than the first area, the first sharing operation includes an operation for a second icon, and the second icon is an icon of the first common APP in the first area.

In an optional design, the transceiver interface is further configured to receive a third sharing operation for a second common APP, where the third sharing operation is used to instruct to share data of the second common APP of the first terminal device with the second terminal device;

the processor is further configured to display information about second data of the second common APP installed in the apparatus, where the second data is data that is in the second common APP of the first terminal device and that can be shared with the second terminal device; and the transceiver interface is further configured to: after receiving a fourth sharing operation, transmit, to the second terminal device, second target data indicated by the fourth sharing operation, where the second target data belongs to the second data.

According to a fourth aspect, an embodiment of this application provides a terminal device interaction apparatus, applied to a second terminal device and including:
a transceiver interface and a processor, where
the transceiver interface is configured to receive a first sharing instruction transmitted by a first terminal device, where the first sharing instruction is used to indicate that the first terminal device needs to share data of a first common APP in the second terminal device, and an APP installed in both the first terminal device and the second terminal device is a common APP;
the processor is configured to determine information about first data corresponding to the first sharing instruction, where the first data is data that is in the first common APP of the second terminal device and that can be shared with the first terminal device; and
the transceiver interface is further configured to: transmit the information about the first data, receive a second sharing instruction, and transmit first target data, where the second sharing instruction indicates that the first terminal device needs to share the first target data in the first data.

According to a fifth aspect, an embodiment of this application provides a terminal apparatus, including:
at least one processor and a memory, where
the memory is configured to store program instructions; and
the at least one processor is configured to invoke and execute the program instructions stored in the memory, and when the processor executes the program instructions, the apparatus is enabled to perform the method according to the first aspect.

According to a sixth aspect, an embodiment of this application provides a terminal apparatus, including:
at least one processor and a memory, where
the memory is configured to store program instructions; and
the at least one processor is configured to invoke and execute the program instructions stored in the memory, and when the processor executes the program instructions, the apparatus is enabled to perform the method according to the second aspect.

According to a seventh aspect, an embodiment of this application provides a computer-readable storage medium, where
the computer-readable storage medium stores instructions, and when the instructions are run on a computer, the computer is enabled to perform the method according to the first aspect.

According to an eighth aspect, an embodiment of this application provides a computer-readable storage medium, where
the computer-readable storage medium stores instruction, and when the instructions are run on a computer, the computer is enabled to perform the method according to the second aspect.

According to a ninth aspect, an embodiment of this application provides a computer program product including instructions; and when the computer program product runs on an electronic device, the electronic device is enabled to perform the method according to the first aspect.

According to a tenth aspect, an embodiment of this application provides a computer program product including instructions; and when the computer program product runs on an electronic device, the electronic device is enabled to perform the method according to the second aspect.

Embodiments of this application provide a terminal device interaction method and apparatus. In the method, when a first terminal device needs to share data of a second terminal device, a user of the first terminal device performs a first sharing operation on the first terminal device, so that the first terminal device receives the first sharing operation for a first common APP; then, through communication interaction between the first terminal device and the second terminal device, a screen of the first terminal device may be enabled to display information about first data, where the first data includes first target data that the first terminal device expects to share; and then the user of the first terminal device performs a second sharing operation, so that the first terminal device determines, based on the second sharing operation, the first target data that needs to be shared, and then the first terminal device may obtain the first target data through communication interaction with the second terminal device.

In a conventional technology, if the first terminal device needs to obtain the first target data of the second terminal device, the second terminal device needs to log in to cloud storage software by using an account, and upload data that needs to be shared to the cloud storage software; and then the first terminal device logs in to the cloud storage software by using the same account, and then searches for and downloads the first target data. Operations are relatively complex, resulting in relatively low data interaction efficiency.

However, according to the method provided in this embodiment of this application, the user only needs to perform the first sharing operation on the first common APP displayed on the first terminal device, and perform the second sharing operation on the information about the first data displayed on the first terminal device, so that the first terminal device can obtain the first target data in the second terminal device, to implement data interaction. Compared with the conventional technology, fewer operations need to be performed by the user, and the operations are simpler and more convenient, thereby correspondingly improving the data interaction efficiency.

DESCRIPTION OF EMBODIMENTS

The following describes technical solutions in embodiments of this application with reference to accompanying drawings in embodiments of this application.

Terms used in the following embodiments are merely intended to describe particular embodiments, but are not intended to limit this application. As used in this specification and the appended claims of this application, the terms "one", "a/an", "said", "the", and "this" of singular forms are also intended to include, for example, the form of "one or more", unless otherwise specified in the context clearly. It should be further understood that in the following embodiments of this application, "at least one" and "one or more" mean one, two, or more than two. The term "and/or" is used to describe an association relationship between associated objects, and indicates that three relationships may exist. For example, A and/or B may represent the following three cases: Only A exists, both A and B exist, and only B exists. A and B may be singular or plural. The character "/" generally indicates an "or" relationship between the associated objects.

Referring to "one embodiment" or "some embodiments" or the like described in this specification means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have" and their variants mean "including but not limited to" unless specifically emphasized otherwise.

In an existing terminal device interaction technology, there are problems of complex operations and low data interaction efficiency. To resolve this problem, embodiments of this application provide a terminal device interaction method and apparatus.

The method is applied to a terminal device. The terminal device may be a terminal device such as a mobile phone, a tablet computer, a notebook computer, an ultra-mobile personal computer (UMPC), a handheld computer, a netbook, a personal digital assistant (PDA), a smart wearable device, or a virtual reality device, or the like, which is not limited in this embodiment of this application.

Figure 1:
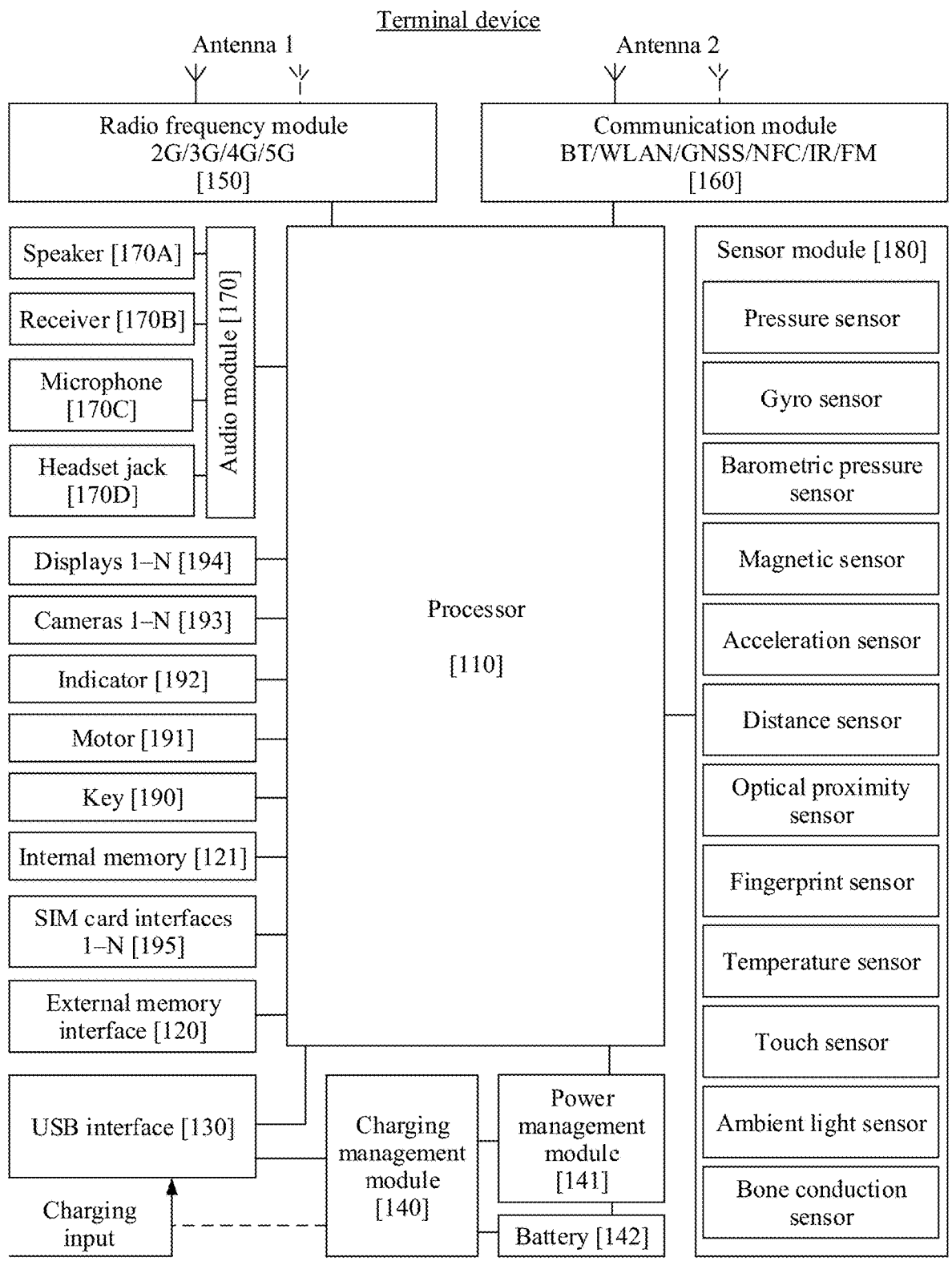
FIG. 1 is a schematic diagram of a structure of a terminal device according to an embodiment of this application.

For example, the foregoing terminal device is a mobile phone. FIG. 1 is a schematic diagram of a structure of the mobile phone.

The mobile phone may include a processor 110, an external memory interface 120, an internal memory 121, a universal serial bus (USB) port 130, a charging management module 140, a power management module 141, a battery 142, an antenna 1, an antenna 2, a radio frequency module 150, a communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like.

It can be understood that the schematic structure in this embodiment of this application does not constitute a specific limitation on the mobile phone. In some other embodiments of this application, the mobile phone may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the mobile phone. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to a touch sensor, a charger, a flash, the camera 193, and the like by using different I2C bus interfaces. For example, the processor 110 may be coupled to the touch sensor by using the I2C interface, so that the processor 110 communicates with the touch sensor by using the I2C bus interfaces to implement a touch function of the mobile phone.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the communication module 160 by using the I2S interface, to implement a function of answering a call by using a Bluetooth headset.

The PCM interface may also be configured to perform audio communication, and sample, quantize, and encode an analog signal. In some embodiments, the audio module 170 may be coupled to the communication module 160 by using a PCM bus. In some embodiments, the audio module 170 may also transmit an audio signal to the communication module 160 by using the PCM interface, to implement a function of answering a call by using a Bluetooth headset. Both the I2S interface and the PCM interface may be used to perform audio communication.

The UART interface is a universal serial data bus used for asynchronous communication. The bus may be a two-way communication bus. The bus converts to-be-transmitted data between serial communication and parallel communication. In some embodiments, the UART interface is usually configured to connect the processor 110 to the communication module 160. For example, the processor 110 communicates with a Bluetooth module in the communication module 160 by using the UART interface, to implement a Bluetooth function. In some embodiments, the audio module 170 may transmit an audio signal to the communication module 160 by using the UART interface, to implement a function of playing music by using a Bluetooth headset.

The MIPI interface may be configured to connect the processor 110 to a peripheral device such as the display 194 or the camera 193. The MIPI interface includes a camera serial interface (CSI), a display serial interface (DSI), and the like. In some embodiments, the processor 110 and the camera 193 communicate with each other by using the CSI interface, to implement a photographing function of the mobile phone. The processor 110 communicates with the display 194 by using the DSI interface, to implement a display function of the mobile phone.

The GPIO interface may be configured by using software. The GPIO interface may be configured as a control signal, or may be configured as a data signal. In some embodiments, the GPIO interface may be configured to connect the processor 110 to the camera 193, the display 194, the communication module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the mobile phone, or may be configured to transmit data between the mobile phone and a peripheral device. The interface may be configured to connect to a headset, to play audio by using the headset. The interface may be further configured to connect to another terminal device such as an AR device.

It can be understood that an interface connection relationship between the modules illustrated in embodiments of this application is merely an example for description, and does not constitute a limitation on a structure of the mobile phone. In some other embodiments of this application, the mobile phone may alternatively use an interface connection manner different from those in the foregoing embodiments or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger by using the USB interface 130. In some wireless charging embodiments, the charging management module 140 may receive a wireless charging input by using a wireless charging coil of the mobile phone. In addition to charging the battery 142, the charging management module 140 may further supply power to the terminal device by using the power management module 141.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the communication module 160, and the like. The power management module 141 may be further configured to monitor parameters such as battery capacity, a battery cycle quantity, and a battery health status (leakage and impedance). In some other embodiments, the power management module 141 may alternatively be disposed in the processor 110. In some other embodiments, the power management module 141 and the charging management module 140 may be alternatively disposed in a same device.

A wireless communication function of the mobile phone may be implemented by using the antenna 1, the antenna 2, the radio frequency module 150, the communication module 160, the modem processor, the baseband processor, and the like.

The antenna 1 and the antenna 2 are configured to transmit and receive an electromagnetic wave signal. Each antenna in the mobile phone may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The radio frequency module 150 may provide a solution that is applied to a mobile phone and that includes wireless communication such as 2G/3G/4G/5G. The radio frequency module 150 may include at least one filter, a switch, a power amplifier, a low noise amplifier (low noise amplifier, LNA), and the like. The radio frequency module 150 may receive an electromagnetic wave by using the antenna 1, perform processing such as filtering or amplification on the received electromagnetic wave, and transmit the electromagnetic wave to the modem processor for demodulation. The radio frequency module 150 may further amplify a signal modulated by the modem processor, and convert the signal into an electromagnetic wave for radiation by using the antenna 1. In some embodiments, at least some function modules of the radio frequency module 150 may be disposed in the processor 110. In some embodiments, at least some function modules of the radio frequency module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the radio frequency module 150 or another function module.

The communication module 160 may provide a wireless communication solution that is applied to the mobile phone, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The communication module 160 may be one or more devices integrating at least one communication processing module. The communication module 160 receives an electromagnetic wave by using the antenna 2, performs frequency modulation and filtering processing on an electromagnetic wave signal, and sends a processed signal to the processor 110. The communication module 160 may further receive a to-be-sent signal from the processor 110, perform frequency modulation and amplification on the signal, and convert the signal into an electromagnetic wave for radiation by using the antenna 2.

In some embodiments, the antenna 1 of the mobile phone is coupled to the radio frequency module 150, and the antenna 2 is coupled to the communication module 160, so that the mobile phone can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information. In this embodiment of this application, the display 194 may include a display and a touch device. The display is configured to output display content to the user, and the touch device is configured to receive a touch event input by the user on the display 194.

In the mobile phone, the sensor module 180 may include one or more of a gyroscope, an acceleration sensor, a pressure sensor, a barometric pressure sensor, a magnetic sensor (for example, a Hall effect sensor), a distance sensor, an optical proximity sensor, a fingerprint sensor, a temperature sensor, a touch sensor, and a pyroelectric infrared sensor, an ambient light sensor, a bone conduction sensor, or the like. This is not limited in this embodiment of this application.

The mobile phone can implement a photographing function by using the ISP, the camera 193, the video codec, the GPU, the flexible display 194, the application processor, and the like.

The ISP is configured to process data fed back by the camera 193. For example, during photographing, a shutter is pressed, and light is transmitted to a photosensitive element of the camera by using a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated by using the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the mobile phone may include one or N cameras 193, where N is a positive integer greater than 1.

The digital signal processor is configured to process a digital signal, and may process another digital signal in addition to the digital image signal. For example, when the mobile phone selects a frequency, the digital signal processor is configured to perform Fourier transformation on frequency energy.

The video codec is configured to compress or decompress a digital video. The mobile phone may support one or more video codecs. In this way, the mobile phone can play or record videos in various coding formats such as moving picture experts group (moving picture experts group, MPEG) 1, MPEG2, MPEG3, and MPEG4.

The NPU is a neural-network (NN) computing processor. By referring to a structure of a biological neural network, such as a transfer mode between human brain neurons, the NPU quickly processes input information, and can further perform continuous self-learning. Applications such as an intelligent cognition of the mobile phone may be implemented by using the NPU, such as image recognition, facial recognition, speech recognition, and text understanding.

The external memory interface 120 may be configured to connect to an external storage card such as a micro SD card, to extend a storage capability of the mobile phone. The external storage card communicates with the processor 110 by using the external memory interface 120, to implement a data storage function. For example, files such as music and videos are stored in the external storage card.

The internal memory 121 may be configured to store computer-executable program code, where the executable program code includes instructions. The processor 110 executes various function applications and data processing of the mobile phone by running instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and a phonebook) created during use of the mobile phone, and the like. In addition, the internal memory 121 may include a high-speed random access memory, and may further include a non-volatile memory, for example, at least one magnetic disk storage device, a flash memory device, and a universal flash storage (UFS).

The mobile phone can implement audio functions (such as music playing and sound recording) by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The mobile phone may be used to listen to music or answer a hands-free call by using the speaker 170A.

The receiver 170B, also referred to as an "earpiece", is configured to convert an electrical audio signal into a sound signal. When the mobile phone is used to answer a call or receive voice information, the receiver 170B may be put close to a human ear, to receive voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the mobile phone. In some other embodiments, two microphones 170C may be disposed in the mobile phone, to collect a sound signal and implement a noise reduction function. In some other embodiments, three, four, or more microphones 170C may alternatively be disposed in the mobile phone, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The key 190 includes a power key, a volume key, and the like. The key 190 may be a mechanical key, or may be a touch key. The mobile phone may receive a key input, and generate a key signal input related to a user setting or function control of the mobile phone.

The motor 191 may generate a vibration prompt. The motor 191 may be configured to provide an incoming call vibration prompt and a touch vibration feedback. For example, touch operations performed on different applications (such as photographing and audio playing) may correspond to different vibration feedback effects. The motor 191 may also correspond to different vibration feedback effects for touch operations performed on different areas of the flexible display 194. Different application scenarios (such as a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile phone. The mobile phone may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The mobile phone interacts with a network by using the SIM card, to implement functions such as calling and data communication. In some embodiments, the mobile phone uses an eSIM, that is, an embedded SIM card. The eSIM card may be embedded in the mobile phone, and cannot be separated from the mobile phone.

In addition, an operating system runs on the foregoing components, for example, an iOS operating system developed by Apple, an Android Android open-source operating system developed by Google, and a Windows operating system developed by Microsoft. An application may be installed and run on the operating system.

To clarify the solutions provided in this application, the following describes the solutions provided in this application by using embodiments with reference to the accompanying drawings.

An embodiment of this application provides a terminal device interaction method. The terminal device interaction method is applied to a first terminal device. The first terminal device may establish a communication connection to a second terminal device, and perform data interaction through the communication connection. Refer to a schematic diagram of a workflow shown in FIG. 2. The terminal device interaction method provided in this embodiment of this application includes the following steps.

Step S11: A first terminal device receives a first sharing operation for a first common application APP.

APPs installed in both the first terminal device and the second terminal device are common APPs. In this case, the first common APP is an APP in the common APPs.

In this embodiment of this application, the first terminal device and the second terminal device may be of a plurality of types. For example, the first terminal device may be a mobile phone, a tablet computer, a notebook computer, an ultra-mobile personal computer (UMPC), a handheld computer, a netbook, or a personal digital assistant (PDA), a smart wearable device, a virtual reality device, and the like.

In addition, the first terminal device and the second terminal device may be terminal devices of a same type, or may be terminal devices of different types. This is not limited in this embodiment of this application.

To meet various requirements of a user, a plurality of APPs are usually installed in a terminal device. In this embodiment of this application, APPs installed in a terminal device may be classified into common APPs and differentiated APPs. It is assumed that two terminal devices that need to perform data interaction are a first terminal device and a second terminal device. In this case, APPs installed in both the first terminal device and the second terminal device are common APPs, APPs that are not installed in either of the first terminal device and the second terminal device are differentiated APPs.

Through data interaction, the first terminal device and the second terminal device may generally share data of a common APP. In this case, if the first common APP is installed in both the first terminal device and the second terminal device, and the first terminal device needs to obtain data of the first common APP installed in the second terminal device, the first terminal device may receive the first sharing operation for the first common application APP.

In addition, in this embodiment of this application, data of an APP is usually application data of the APP, where the application data of the APP is data belonging to the APP and/or data created by the APP, and may include locally stored data and data stored in a cloud.

Step S12: The first terminal device transmits a first sharing instruction based on the first sharing operation.

After receiving the first sharing operation, the first terminal device generates the first sharing instruction corresponding to the first sharing operation, and transmits the first sharing instruction to the second terminal device.

The first sharing instruction is used to indicate that the first terminal device needs to share data of the first common APP in the second terminal device.

Step S13: The first terminal device receives and displays information about the first data transmitted by the second terminal device.

The first data is data that is in the first common APP of the second terminal device and that can be shared with the first terminal device.

After receiving the first sharing instruction, the second terminal device may determine, based on the first sharing instruction, that the first terminal device expects to share the data of the first common APP installed in the second terminal device. In this case, the second terminal device may transmit the information about the first data to the first terminal device, so that the first terminal device receives the information about the first data.

The information about the first data may be information such as a name of the first data. In addition, if the first data is a data set, the information about the first data may further include a name of each piece of data in the set, and the like.

For example, the first common APP is an APP used to play a song, and the data of the first common APP includes a playlist set by the first common APP. In this case, the information about the first data may include a name of each playlist, and may further include a name of a song included in each playlist. Correspondingly, after receiving the information about the first data, the first terminal device may display the name of each playlist on the display, and may further display the name of each song included in the playlist.

In addition, the first data is data that is in the first common APP of the second terminal device and that can be shared with the first terminal device. In a feasible design, the first data may be all data included in the first common APP.

The first common APP installed in the second terminal device usually includes a plurality of types of data, and different data has different confidentiality levels. In another feasible design, if confidentiality of some data of the first common APP installed in the second terminal device is relatively high, and the second terminal device does not want the data to be leaked, before transmitting the information about the first data, the second terminal device may screen the data of the first common APP installed in the second terminal device to determine data with relatively low confidentiality, and use the data with relatively low confidentiality as data that can be shared with the first terminal device, and transmit the information of the first data to the first terminal device accordingly.

Further, if the first data includes a plurality of types, after obtaining the information about the first data, the first terminal device may further classify the first data, and display the information about first data of a same type in one group.

For example, if the first data includes three types: a picture, a document, and audio, after obtaining the information about the first data, the first terminal device may group the first data into three groups: a picture, a document, and audio based on the type of the first data, and display the information about the first data of a same type in a corresponding group.

The information about the first data is displayed by category, so that the user of the first terminal device can determine the type of the first data, and the user of the first terminal device can search for the information required by the user of the first terminal device.

Step S14: After receiving the second sharing operation for information about first target data, the first terminal device transmits a second sharing instruction.

The first target data is data in the first data, and the second sharing instruction is used to instruct to share the first target data.

After the first terminal device displays the information about the first data, the information may be viewed by the user of the first terminal device. After determining the first target data that needs to be shared, the user may perform the second sharing operation on the information about the first target data displayed by the first terminal device, so that the first terminal device receives the second sharing operation, and determines the first target data based on the received second sharing operation. For example, the user may perform a tap operation on the first target data displayed on the screen, and the tap operation is the second sharing operation.

After receiving the second sharing operation, the first terminal device generates the corresponding second sharing instruction based on the second sharing operation, and transmits the second sharing instruction to the second terminal device, so that the second terminal device transmits, to the first terminal device based on the received second sharing instruction, data indicated by the second sharing instruction.

Step S15: The first terminal device receives the first target data that is transmitted by the second terminal device based on the second sharing instruction.

After receiving the second sharing instruction, the second terminal device may determine, based on the second sharing instruction, the first target data that needs to be shared by the first terminal device, and transmit the first target data to the first terminal device, so that the first terminal device obtains the first target data, and the first terminal device and the second terminal device share the first target data.

Step S11 to step S15 provide a terminal device interaction method. In the method, when a first terminal device needs to share data of a second terminal device, a user of the first terminal device performs a first sharing operation on the first terminal device, so that the first terminal device receives the first sharing operation for a first common APP; then, through communication interaction between the first terminal device and the second terminal device, a screen of the first terminal device may be enabled to display information about first data, where the first data includes first target data that the first terminal device expects to share; and then the user of the first terminal device performs a second sharing operation, so that the first terminal device determines, based on the second sharing operation, the first target data that needs to be shared, and then the first terminal device may obtain the first target data through communication interaction with the second terminal device.

In the conventional technology, if the first terminal device needs to obtain the first target data of the second terminal device, the second terminal device needs to log in to cloud storage software by using an account, and upload data that needs to be shared to the cloud storage software; and then the first terminal device logs in to the cloud storage software by using the same account, and then searches for and downloads the first target data. Operations are relatively complex, resulting in relatively low data interaction efficiency.

However, according to the method provided in this embodiment of this application, the user only needs to perform the first sharing operation on the first common APP displayed on the first terminal device, and perform the second sharing operation on the information about the first data displayed on the first terminal device, so that the first terminal device can obtain the first target data in the second terminal device, to implement data interaction. Compared with the conventional technology, fewer operations need to be performed by the user, and the operations are simpler and more convenient, thereby correspondingly improving the data interaction efficiency.

Further, in the solution provided in this embodiment of this application, the first terminal device may display the information about the first data, so that the user selects, from the first data, data that the user wants to share, thereby implementing selective data sharing.

Figure 3:
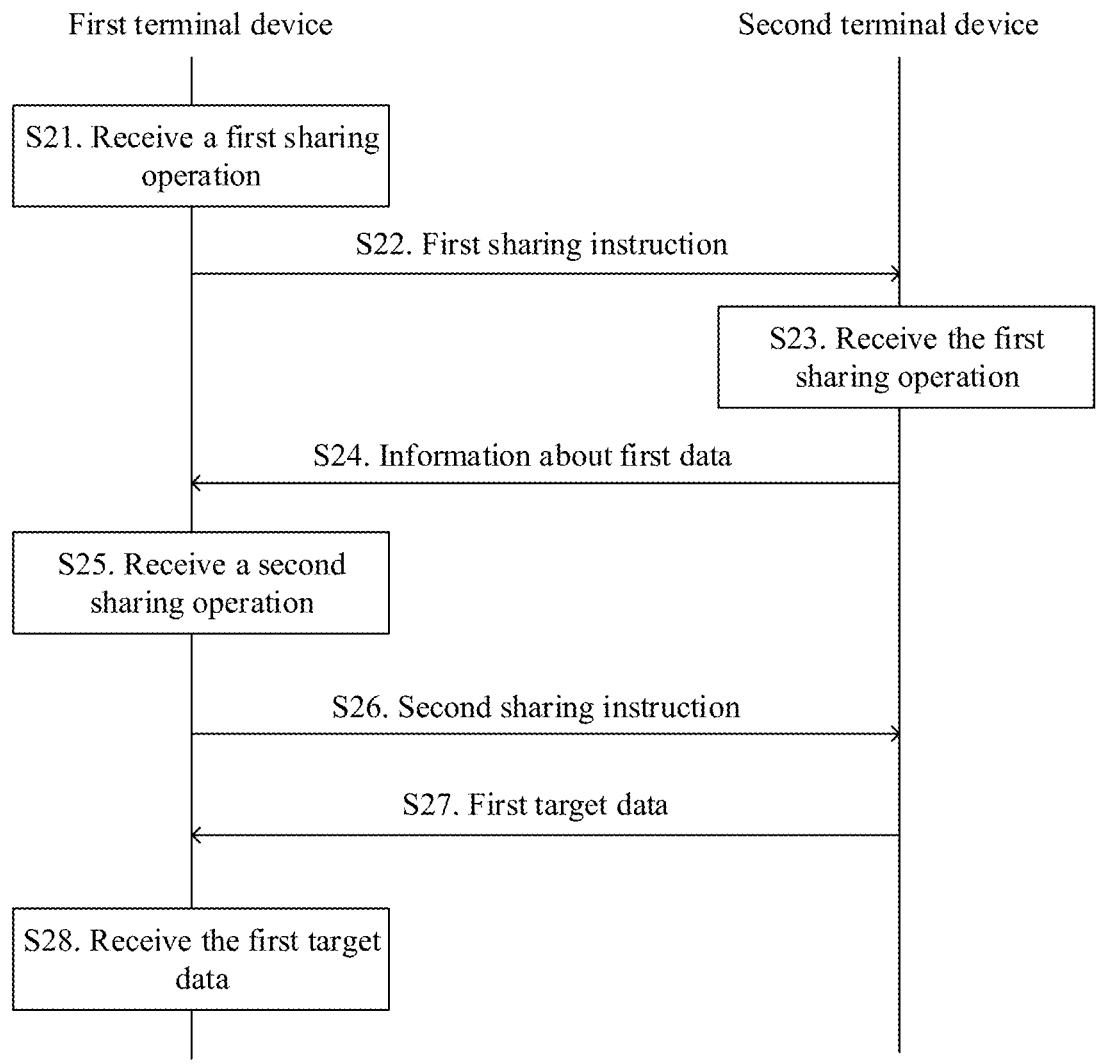
FIG. 3 is a schematic diagram of interaction in a terminal device interaction method according to an embodiment of this application.

To clarify the solutions provided in embodiments of this application, this application further provides FIG. 3. FIG. 3 is a schematic diagram of information interaction between a first terminal device and a second terminal device. Refer to FIG. 3. The terminal device interaction method provided in this embodiment of this application includes the following steps.

Step S21: A first terminal device receives a first sharing operation for a first common APP.

A communication connection is established between the first terminal device and the second terminal device, and the first terminal device expects to share first target data in the second terminal device.

Step S22: The first terminal device generates a first sharing instruction based on the first sharing operation, and transmits the first sharing instruction to the second terminal device.

The first sharing instruction is used to indicate that the first terminal device needs to share data of the first common APP in the second terminal device.

Step S23: The second terminal device receives the first sharing instruction.

Step S24: The second terminal device transmits information about first data to the first terminal device.

The first data is data that is in the first common APP of the second terminal device and that can be shared with the first terminal device.

Step S25: The first terminal device receives a second sharing operation for first target data.

The first terminal device may determine, based on the second sharing operation, that the first target data in the first data needs to be shared.

Step S26: The first terminal device generates and transmits a second sharing instruction.

The second sharing instruction is used to instruct to share the first target data in the first data.

Step S27: After receiving the second sharing instruction, the second terminal device transmits the first target data to the first terminal device.

Step S28: The first terminal device receives the first target data.

According to the foregoing data interaction process, it may be determined that in the solution provided in this embodiment of this application, the first target data can be shared between the first terminal device and the second terminal device based on interaction between the first terminal device and the second terminal device. In addition, in this process, the user only needs to perform the first sharing operation on the first common APP and perform the second sharing operation on the first target data. The operations are relatively simple, so that interaction efficiency of the terminal device can be effectively improved.

Further, the solution provided in this embodiment of this application further includes the following steps:

determining, by the first terminal device, a common APP in APPs installed in the first terminal device; and
highlighting, by the first terminal device, an icon of the common APP included in a screen of the first terminal device.

In the solution provided in this embodiment of this application, the APPs installed in the terminal device are classified into common APPs and differentiated APPs, and data of a common APP in the first terminal device and the second terminal device may be shared. In this case, in the solution provided in this embodiment of this application, the first terminal device determines the common APP, and highlights the common APP on the screen of the first terminal device, so that the user of the first terminal device identifies the common APP and a differentiated APP, and further, the user can easily perform a corresponding sharing operation on the identified common APP. Therefore, it is convenient to implement data sharing between different terminal devices, and user experience is effectively improved.

In the solution provided in this embodiment of this application, the icon of the common APP may be highlighted in a plurality of manners. For example, a color of the icon of the common APP may be deepened, an area of the icon of the common APP may be enlarged, and a highlighted color may be set at an edge of the icon of the common APP. This is not limited in this embodiment of this application.

In addition, an interface of the second terminal device may be displayed on the screen of the first terminal device. For example, multi-screen collaboration may be performed between the first terminal device and the second terminal device. By using a multi-screen collaboration technology, the first terminal device determines an interface of the second terminal device, and displays the interface on the screen of the first terminal device.

If the screen of the first terminal device displays the interface of the second terminal device, the screen of the first terminal device includes a first area and a second area, where the first area is an area for displaying the interface of the second terminal device, and the second area is an area other than the first area. The second area may display an icon of each APP installed in the first terminal device, and the first area is used to display an icon of each APP installed in the second terminal device.

In this case, when highlighting the icon of the common APP included in the screen of the first terminal device, the first terminal device also highlights the icon of the common APP installed in the first terminal device, and highlights the icon of the common APP installed in the second terminal device (that is, the icon of the common APP in the first area) included in the screen of the first terminal device.

To clarify a solution in which the first terminal device highlights the icon of the common APP provided in this embodiment of this application, this application provides an example. A schematic diagram corresponding to the example is FIG. 4.

Figure 4:
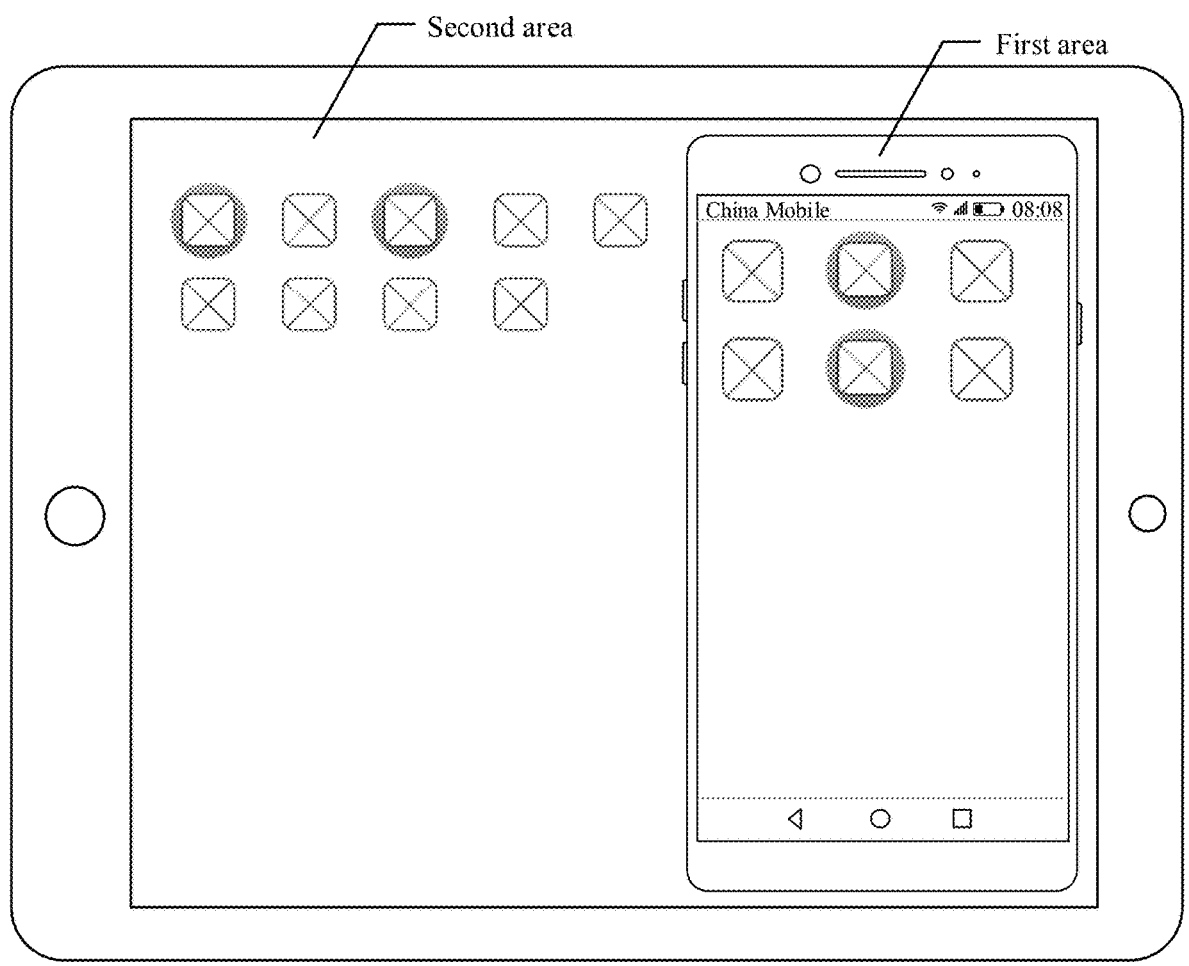
FIG. 4 is a schematic diagram of an interface in a terminal device interaction method according to an embodiment of this application.

Refer to a schematic diagram shown in FIG. 4. In this example, the first terminal device is a tablet computer, and the second terminal device is a mobile phone. FIG. 4 shows a screen of the first terminal device, including a first area and a second area. The first area displays an interface of the second terminal device. The first terminal device and the second terminal device have two common APPs, and in this case, both the icon of the common APP in the first area and the icon of the common APP in the second area are highlighted. In addition, in this example, a highlighting manner is setting a highlight color at an edge of the icon of the common APP. Therefore, by viewing the screen of the first terminal device, the user may determine the common APP in the first terminal device and the second terminal device.

In the solution provided in this embodiment of this application, the first terminal device needs to determine the common APP in the APPs installed in the first terminal device. In a feasible implementation, that the first terminal device determines a common APP in APPs installed in the first terminal device may include the following steps: First, the first terminal device obtains desktop layout data of the second terminal device, where the desktop layout data of the second terminal device is used to indicate an installation package of an APP installed in the second terminal device.

Then, if an operating system of the first terminal device is the same as that of the second terminal device, the first terminal device determines the common APP based on a name of an installation package of an APP installed in the first terminal device and a name of an installation package of an APP installed in the second terminal device, where an APP indicated by installation packages with a same name is the common APP.

The desktop layout data of the second terminal device may be data that is about the desktop layout of the second terminal device and that is provided by a desktop launcher of the second terminal device. Related information of an installation package of each APP displayed on a desktop of the second terminal device may be determined based on the data.

Operating systems of the first terminal device and the second terminal device may be the same. For example, the operating systems of the first terminal device and the second terminal device may both be the Android operating system, or may both be the Harmony operating system, or may both be the emotion user interface (EMUI) system. This is not limited in this embodiment of this application.

If the operating systems of the first terminal device and the second terminal device are the same, names of installation packages of a same APP in the first terminal device and the second terminal device are usually the same. In this case, the first terminal device determines names of installation packages of all APPs in the second terminal device based on the desktop layout data of the second terminal device, compare the names of the installation packages of the APPs installed in the second terminal device with the names of the installation packages of the APPs in the second terminal device, and determine that APPs that have the same names of installation packages in the two terminal devices are common APPs, and other APPs are differentiated APPs.

In addition, if the operating systems of the first terminal device and the second terminal device are different, after obtaining the desktop layout data, the first terminal device may analyze the second terminal device and an installation package of an APP installed in the first terminal device, to determine a function that can be executed by each APP, and use APPs that can perform a same or similar function in the two terminal devices as common APPs.

Alternatively, if the operating systems of the first terminal device and the second terminal device are different, a matching rule may be set in the first terminal device based on a difference between the installation packages of the APPs in the operating systems, where the matching rule includes features of a same APP in different operating systems, and the like. For example, the matching rule may include names of the installation packages of a same APP in different operating systems. In this case, after obtaining the desktop layout data of the second terminal device, the first terminal device may determine the common APP according to the matching rule.

Certainly, the first terminal device may alternatively determine the common APP in another manner. This is not limited in this embodiment of this application.

In an interaction process of the terminal device, the first terminal device needs to receive a first sharing operation for a first common APP. The first sharing operation may be an operation in a plurality of forms.

In a feasible implementation, the first sharing operation includes an operation for a first icon, first icon is an icon of the first common APP installed in the first terminal device.

A desktop of the first terminal device includes icons of all APPs installed in the first terminal device, which may include the first icon. In this implementation, the first sharing operation is an operation for the first icon.

Figure 5:
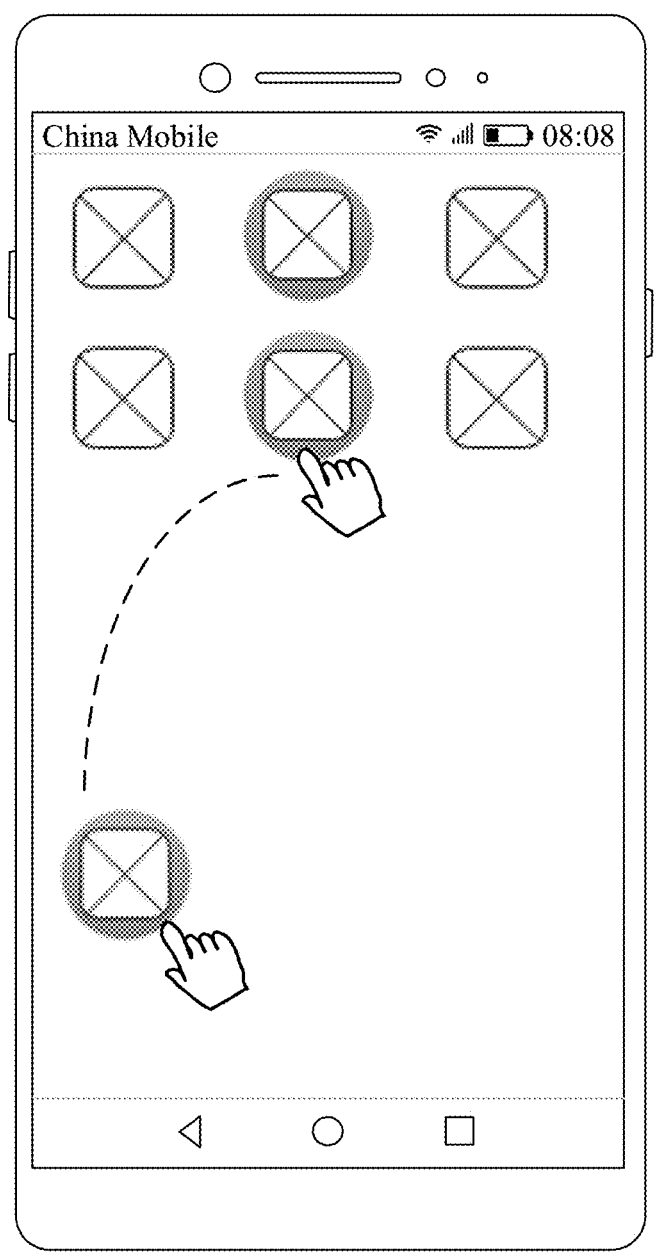
FIG. 5 is a schematic diagram of still another interface in a terminal device interaction method according to an embodiment of this application.

The operation for the first icon may be in a plurality of forms, for example, may be a tap operation for the first icon, a double-tap operation for the first icon, or an operation of dragging the first icon along a specific trajectory. The specific trajectory may be a line segment, a curve, an arc, or the like. For example, referring to FIG. 5, it is assumed that FIG. 5 is an interface of the first terminal device, and an outer edge of the first icon includes a highlighted part of a circle. In this example, the first sharing operation may be dragging the first icon along a curve.

Alternatively, in another feasible implementation, the screen of the first terminal device includes a first area and a second area, the first area is an area for displaying an interface of the second terminal device, and the second area is an area other than the first area. In this case, the first sharing operation includes an operation for a second icon, and the second icon is an icon of the first common APP in the first area.

If the screen of the first terminal device displays the interface of the second terminal device, the screen of the first terminal device includes a first area and a second area, where the first area is an area for displaying the interface of the second terminal device, and the second area is an area other than the first area. In this case, the second area may display an icon of each APP installed in the first terminal device, and the first area may display an icon of each APP installed in the second terminal device.

Figure 6A:
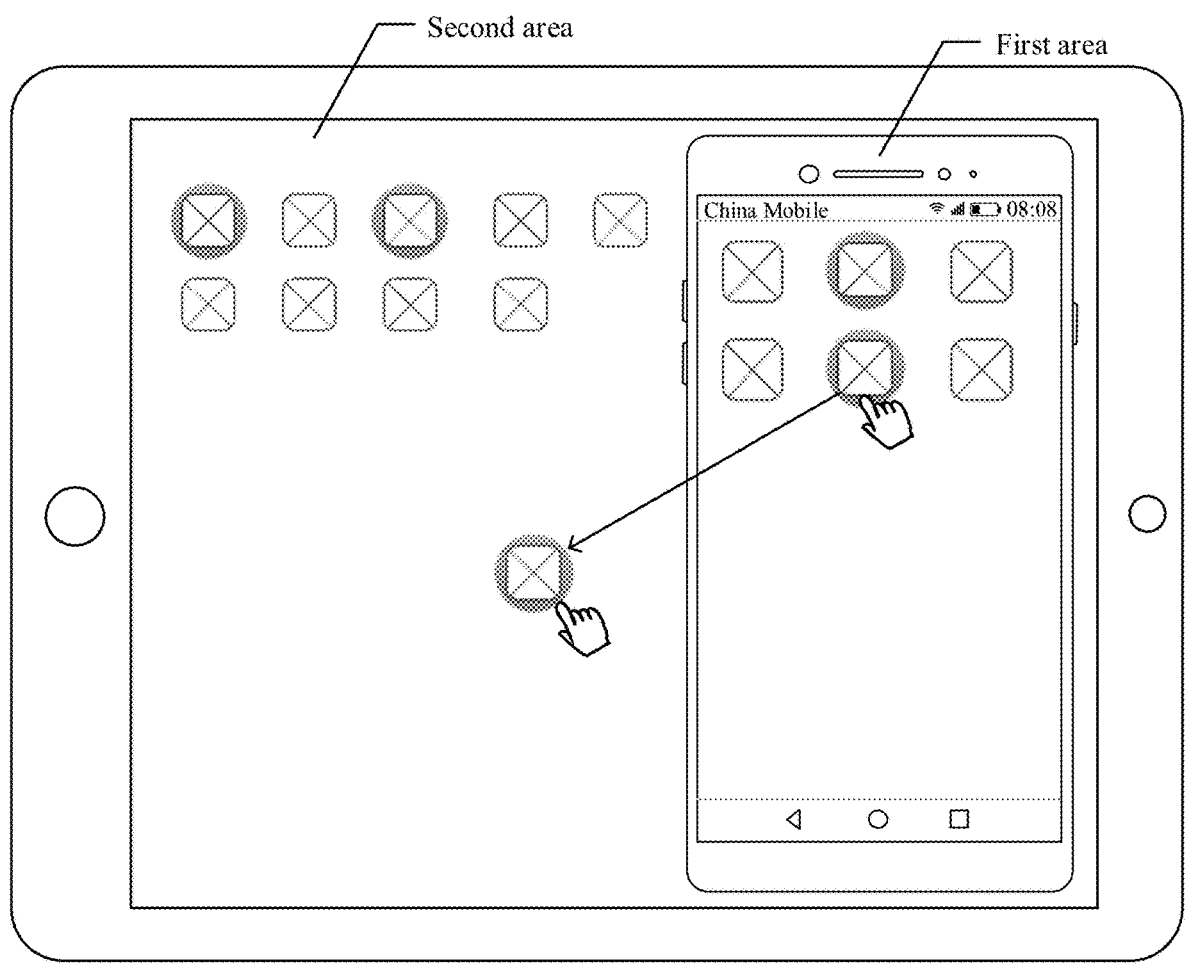
FIG. 6(a) is a schematic diagram of still another interface in a terminal device interaction method according to an embodiment of this application.

In this case, referring to a schematic diagram of an interface shown in FIG. 6(a), the operation for the second icon may be a drag operation for the second icon, and the drag operation for the second icon is used to drag the first icon to the second area.

Correspondingly, if the first terminal device receives a drag operation for the second icon, but the drag operation does not drag the second icon to the second area, the first terminal device usually does not consider the drag operation as the first sharing operation.

Certainly, the first sharing operation may also be an operation in another form. This is not limited in this embodiment of this application.

In addition, after receiving the first sharing operation, the first terminal device further transmits the first sharing instruction, and displays the information about the first data transmitted by the second terminal device. If the screen of the first terminal device includes a first area and a second area, the first terminal device usually displays the information about the first data in the second area.

Figure 6B:
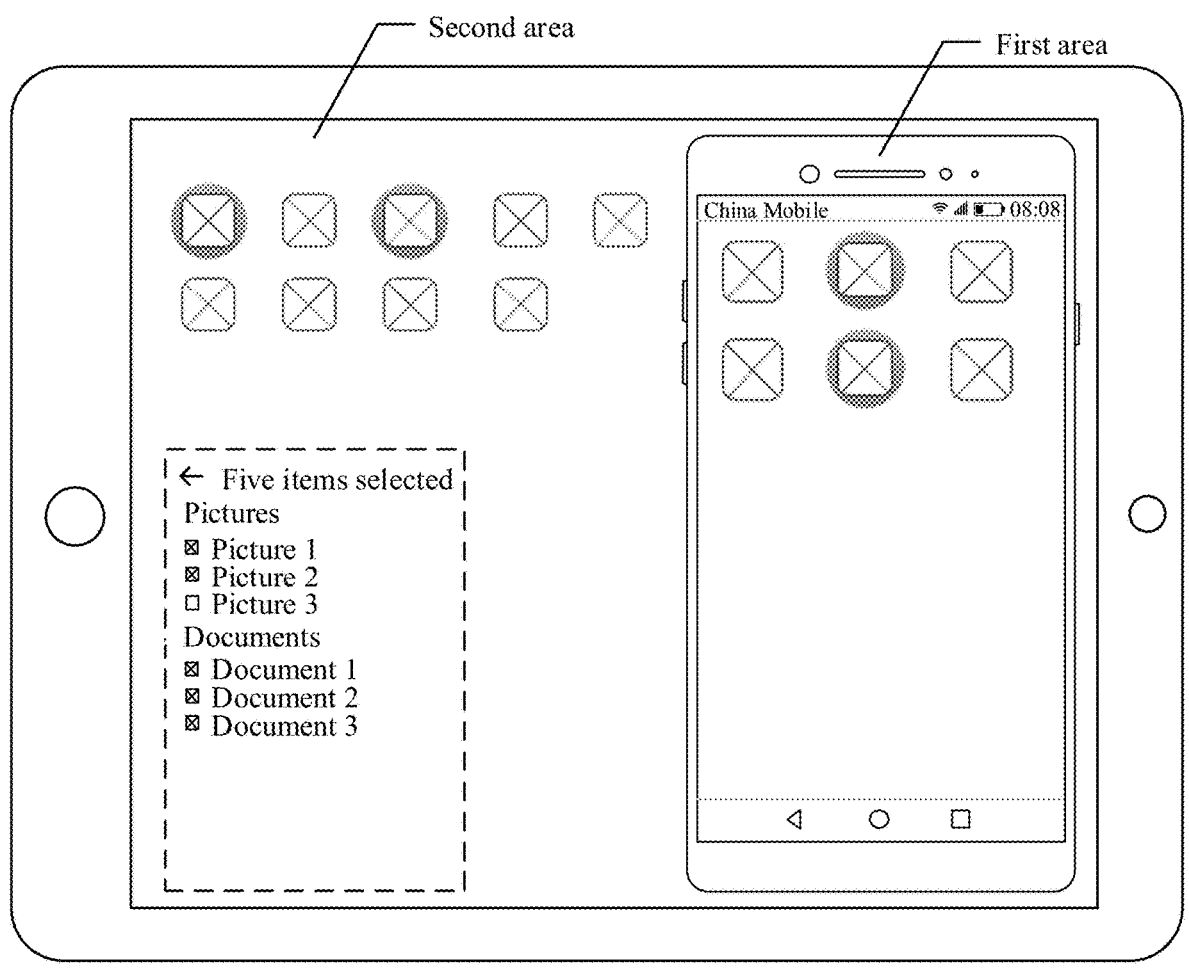
FIG. 6(b) is a schematic diagram of still another interface in a terminal device interaction method according to an embodiment of this application.

In this case, referring to a schematic diagram of an interface shown in FIG. 6(b), in the schematic diagram, the second area includes a dashed box, and the dashed box includes information about at least one piece of the first data for the user of the first terminal device to select. In addition, it is assumed that in the example corresponding to FIG. 6(b), the first data includes a plurality of types, for example, a picture and a document. When the information about the first data is displayed, data of a same type is displayed in one group. Correspondingly, in the interface shown in FIG. 6(b), pictures and documents are displayed in one group.

Further, to prevent a misoperation, the solution provided in this embodiment of this application may further include the following steps.

First, after receiving the first sharing operation, the first terminal device displays a first selection box, where the first selection box is used to indicate whether to share the data of the second terminal device with the first terminal device.

Then, after receiving a confirmation operation for the first selection box, the first terminal device transmits the first sharing instruction. The confirmation operation is used to indicate that the data of the second terminal device needs to be shared with the first terminal device.

The user of the first terminal device sometimes does not want to share the data of the second terminal device, but performs an accidental touch on the first terminal device, and the first terminal device may use the received accidental touch as a sharing operation. To avoid this case, in the solution provided in this embodiment of this application, after receiving the first sharing operation, the first terminal device may display the first selection box, so that the user performs an operation on the first selection box to select whether to share the data of the second terminal device with the first terminal device.

If the confirmation operation for the first selection box is received, it indicates that the user of the first terminal device expects to obtain the data of the first common APP in the second terminal device. In this case, the first terminal device transmits the first sharing instruction to the second terminal device. In addition, if a negative operation for the first selection box is received, it indicates that the user of the first terminal device does not want to obtain the data of the first common APP in the second terminal device. In this case, the first terminal device does not transmit the first sharing instruction to the first terminal device.

Figure 7:
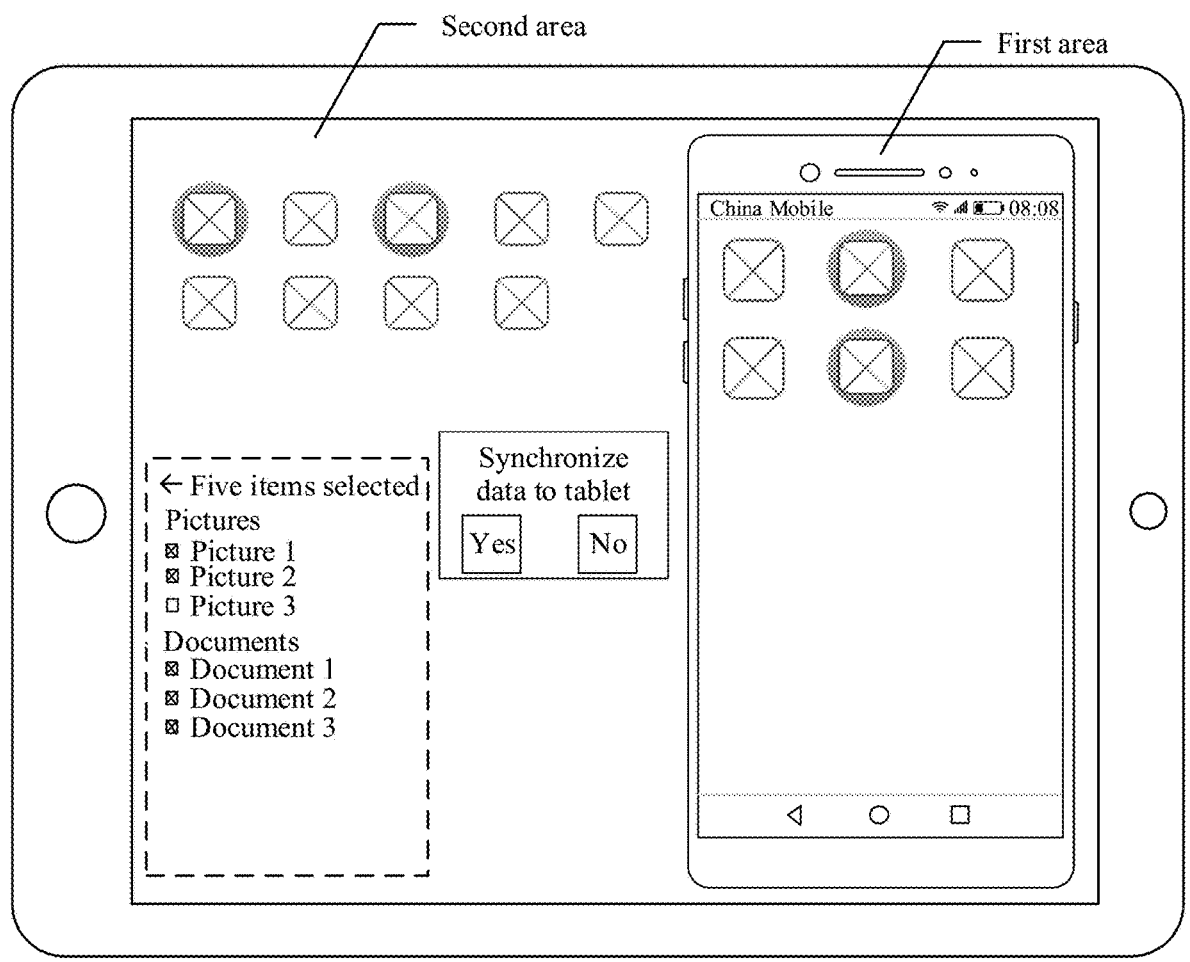
FIG. 7 is a schematic diagram of still another interface in a terminal device interaction method according to an embodiment of this application.

In an example, the first terminal device is a tablet computer, the second terminal device is a mobile phone, and the first selection box may be shown in FIG. 7. Refer to a schematic diagram shown in FIG. 7. FIG. 7 is a schematic diagram of an interface of the first terminal device, where a first area and a second area are displayed, icons of common APPs in the first area and the second area are highlighted, and after the first sharing operation is received, the first selection box shown in FIG. 7 is displayed on the interface, the first selection box includes a prompt of "synchronizing data to the tablet end", and includes two selection menus: "Yes" and "No".

In this case, the confirmation operation for the first selection box may be a selection operation for the selection menu "Yes". In addition, if the selection operation for the selection menu "No" is received, it may be considered that the selection operation is a negative operation for the first selection box.

According to the solution provided in the foregoing embodiment of this application, the first terminal device can obtain the data of the second terminal device. In addition, in some cases, the second terminal device expects to obtain data in the first terminal device. To meet this requirement, referring to a schematic diagram of a workflow shown in FIG. 8, the method provided in this embodiment of this application further includes the following steps.

Step S31: A first terminal device receives a third sharing operation for a second common APP.

The third sharing operation is used to instruct to share data of the second common APP in the first terminal device with the second terminal device.

In this embodiment of this application, a user of the first terminal device expects to share data of a second common APP installed in the first terminal device with the second terminal device.

Step S32: The first terminal device displays information about second data of the second common APP installed in the first terminal device.

The second data is data that is in the second common APP in the first terminal device and that can be shared with the second terminal device.

The information about the second data may be information such as a name of the second data. In addition, if the second data includes a plurality of types, when displaying the information about the second data, the first terminal device may classify the second data, and display the second data of a same type in one group.

In addition, if the second common APP in the first terminal device includes a plurality of types of data, confidentiality of a part of the data is relatively high, and the first terminal device does not want the part of data to be leaked, the first terminal device may screen data that can be shared with the second terminal device from the data, and then display information about the screened data.

Step S33: After receiving a fourth sharing operation, the first terminal device transmits, to the second terminal device, second target data indicated by a third sharing operation, where the second target data belongs to the second data.

Through the foregoing steps, the second terminal device may obtain the second target data, so as to share the data of the first terminal device with the second terminal device.

The third sharing operation usually includes an operation for a third icon, where the third icon is an icon of the second common APP installed in the first terminal device.

A desktop of the first terminal device includes icons of all APPs installed in the first terminal device, which may include a third icon. In addition, the third sharing operation may be an operation in a plurality of forms.

In a feasible implementation, the third sharing operation may be a tap operation for the third icon, a double-tap operation for the third icon, or an operation of dragging the third icon along a specific trajectory. The specific trajectory may be a line segment, a curve, an arc, or the like.

Alternatively, in another feasible implementation, if the screen of the first terminal device includes a first area and a second area, where the first area is an area for displaying an interface of the second terminal device and the second area is an area other than the first area, the third sharing operation is a drag operation for the third icon, and the drag operation for the third icon is used to drag the third icon to the first area.

In this case, if the first terminal device receives a drag operation for the third icon, but the drag operation does not drag the third icon from the second area to the first area, it is usually considered that the drag operation for the third icon is not the third sharing operation.

The user of the first terminal device sometimes does not want to share data of a common APP installed in the first terminal device with the second terminal device, but performs an accidental touch on the first terminal device, and the first terminal device may use the received accidental touch as a sharing operation. To avoid this case, in the solution provided in this embodiment of this application, after receiving the third sharing operation, the first terminal device may further display a selection box, so that the user performs an operation on the selection box to select whether to share data of the first terminal device with the second terminal device.

In this case, after receiving a confirmation operation for the selection box, the first terminal device transmits the second target data to the second terminal device. In addition, if a negative operation for the selection box is received, the first terminal device temporarily stops transmitting the second target data to the second terminal device.

A form of the selection box displayed by the first terminal device after receiving the third sharing operation may be the same as a form of the first selection box; or the two may be different. This is not limited in this embodiment of this application.

In addition, in this embodiment of this application, the method may further include the following steps.

First, if the screen of the first terminal device includes a first area and a second area, where the first area is an area for displaying an interface of the second terminal device and the second area is an area other than the first area on the screen, after receiving a selection operation for a third common APP in the first area, the first terminal device displays a second selection box.

The second selection box is used to indicate whether to start the third common APP installed in the first terminal device.

Then, after receiving a confirmation operation for the second selection box, the first terminal device runs the third common APP installed in the first terminal device.

In addition, after receiving a negative operation for the second selection box, the first terminal device transmits a first running instruction to the second terminal device, where the first running instruction is used to instruct the second terminal device to run the third common APP installed in the second terminal device.

In the solution provided in this embodiment of this application, the first terminal device may display the interface of the second terminal device on the screen of the first terminal device. In this case, the first area used to display the interface of the second terminal device usually includes a fourth icon of the third common APP installed in the second terminal device. A selection operation for the third common APP in the first area may be an operation for the fourth icon in the first area, and the operation may be tapping or double tapping the fourth icon, or dragging the fourth icon. Certainly, the selection operation for the third common APP in the first area may alternatively be an operation in another form. This is not limited in this embodiment of this application.

In some cases, the user of the first terminal device usually wants to apply a third common APP. For example, the third common APP may be an APP used to play a video. When the user has a requirement for watching a video, the user usually needs to run the third common APP.

In addition, through interaction between the first terminal device and the second terminal device, the third common APP installed in the first terminal device is usually capable of obtaining data of the third common APP installed in the second terminal device.

In addition, sometimes the first terminal device has an advantage over the second terminal device. For example, an area of the screen of the first terminal device is greater than an area of the screen of the second terminal device, or a definition of a display of the first terminal device is greater than a definition of a display of the second terminal device, or performance of a processor of the first terminal device is better than performance of a processor of the second terminal device. In this case, the first terminal device runs the third common APP installed in the first terminal device, so that the user can usually obtain better use experience.

For this phenomenon, in the solution provided in this embodiment of this application, after receiving the selection operation for the third common APP in the first area, the first terminal device may display a second selection box, to prompt the user to select whether to run the third common APP by the first terminal device.

If a confirmation operation for the second selection box is received, it indicates that the user expects to run the third common APP installed in the first terminal device. Therefore, after receiving a confirmation operation for the second selection box, the first terminal device runs the third common APP installed in the first terminal device, so that the user of the first terminal device knows a running process of the third common APP.

Further, when running the third common APP installed in the first terminal device, the first terminal device may usually display, in the second area, an interface of the third common APP run on the first terminal device. In addition, after receiving a corresponding operation, the first terminal device may further display, in a full screen, the interface of the third common APP run on the first terminal device.

In some cases, the user usually does not want to run the third common APP installed in the first terminal device, and therefore performs a negative operation on the third selection box. In this case, the solution provided in this embodiment of this application further includes the following steps.

After receiving a negative operation for the second selection box, the first terminal device transmits a first running instruction to the second terminal device, where the first running instruction is used to instruct the second terminal device to run the third common APP installed in the second terminal device. In addition, after receiving the first running instruction, the second terminal device may run the third common APP installed in the second terminal device.

Further, in some cases, the user of the first terminal device expects to directly run the common APP in the second terminal device after performing a selection operation on a common APP in the first area. In this case, the first terminal device may support a function switch. After receiving a setting operation, the first terminal device may display the function switch, so that the user of the first terminal device operates the function switch. If the first terminal device receives an operation of disabling the function switch, after receiving the selection operation for the third common APP in the first area, the first terminal device no longer displays the second selection box, but directly transmits the first running instruction to the second terminal device, so that the second terminal device that receives the first running instruction starts to run the third common APP installed in the second terminal device.

In addition, if the user expects the first terminal device to preferentially run the third common APP, in this case, the user may select to enable the function switch. After receiving an operation of enabling or disabling the function switch, the first terminal device displays the second selection box the selection operation for the third common APP in the first area is received.

Further, the solution provided in this embodiment of this application further includes the following steps.

After receiving the first target data, the first terminal device synchronizes the first target data to the first common APP in the first terminal device.

The first target data comes from the first common APP installed in the second terminal device. In this case, after receiving the first target data, the first terminal device may synchronize the first target data to the first common APP in the first terminal device. After the synchronization is completed, the user of the first terminal device may view and apply the first target data by using the first common APP installed in the first terminal device.

For example, if the first common APP is an APP used to play music, the first target data may include a playlist, and the first terminal device synchronizes the first target data to the first common APP in the first terminal device, that is, the first terminal device synchronizes the playlist to the first common APP installed in the first terminal device, to implement synchronous playlist sharing between the first terminal device and the second terminal device. If the first common APP is an APP used to display calendar information, and the APP may mark schedule and activity information, the first target data may include the marked schedule and activity information; and after synchronization of the first target data is completed, the schedule and activity information marked on the first common APP in the second terminal device may be queried by using the first common APP installed in the first terminal device. If the first common APP is a communication APP, the first target data may include an address book of contacts and the like; and in this case, after synchronization of the first target data is completed, the address book of the contacts stored in the first common APP in the second terminal device may be queried by using the first common APP installed in the first terminal device.

Correspondingly, an embodiment of this application further provides a terminal device interaction method, and the method is applied to a second terminal device. Refer to a schematic diagram of a workflow shown in FIG. 9. The method provided in this embodiment of this application includes the following steps.

Step S41: A second terminal device receives a first sharing instruction transmitted by a first terminal device.

The first sharing instruction is used to indicate that the first terminal device needs to share data of a first common APP in the second terminal device, and an APP installed in both the first terminal device and the second terminal device is a common APP.

The first common APP is installed in the first terminal device. After the first terminal device receives the first sharing operation for the first common APP installed in the first terminal device, the first terminal device may generate the first sharing instruction, and transmit the first sharing instruction to the second terminal device.

Step S42: The second terminal device transmits information about first data corresponding to the first sharing instruction.

The first data is data that is in the first common APP of the second terminal device and that can be shared with the first terminal device. The information about the first data may be information such as a name of the first data. In addition, if the first data is a data set, the information about the first data may further include a name of each piece of data in the set, and the like.

For example, the first common APP is an APP used to play a song, and the data of the first common APP includes a playlist set by the first common APP. In this case, the information about the first data may include a name of each playlist, and may further include a name of a song included in each playlist. Correspondingly, after receiving the information about the first data, the first terminal device may display the name of each playlist on the display, and may further display the name of each song included in the playlist.

In addition, the first data is data that is in the first common APP of the second terminal device and that can be shared with the first terminal device. In a feasible design, the first data may be all data included in the first common APP.

The first common APP installed in the second terminal device usually includes a plurality of types of data, and different data has different confidentiality levels. In another feasible design, if confidentiality of some data of the first common APP installed in the second terminal device is relatively high, and the second terminal device does not want the data to be leaked, before transmitting the information about the first data, the second terminal device may screen the data of the first common APP installed in the second terminal device to determine data with relatively low confidentiality, and use the data with relatively low confidentiality as data that can be shared with the first terminal device, and transmit the information of the first data to the first terminal device accordingly.

After receiving the information about the first data, the first terminal device displays the information about the first data for the user of the first terminal device to select. In addition, after receiving the second sharing operation for information about first target data, the first terminal device transmits a second sharing instruction.

Step S43: The second terminal device receives the second sharing instruction.

The second sharing instruction indicates that the first terminal device needs to share the first target data in the first data.

Step S44: The second terminal device transmits the first target data.

The first terminal device may receive the first target data transmitted by the second terminal device, so that the first terminal device and the second terminal device share the first target data.

According to the solution provided in this embodiment of this application, the first terminal device can obtain the first target data in the second terminal device, to implement interaction between the first terminal device and the second terminal device. In addition, in this implementation process, the second terminal device performs a corresponding operation based on the received first sharing instruction and second sharing instruction, and a user of the second terminal device does not need to perform an operation on the second terminal device. Therefore, compared with the conventional technology, implementations of the solutions provided in this application are simpler, and interaction efficiency of the terminal device can be effectively improved.

In the solution provided in this embodiment of this application, APPs installed in the terminal device are classified into two types: common APPs and differentiated APPs. It is assumed that two terminal devices that need to perform data interaction are a first terminal device and a second terminal device. In this case, APPs installed in both the first terminal device and the second terminal device are common APPs, APPs that are not installed in either of the first terminal device and the second terminal device are differentiated APPs.

In this case, the solution provided in this embodiment of this application may further include the following steps.

First, the second terminal device determines a common APP in APPs installed in the second terminal device.

Then, the second terminal device highlights an icon of the common APP included in a screen of the second terminal device.

In a process of interaction between the first terminal device and the second terminal device, data of the common APP may be shared. In this case, after determining the common APP, the second terminal device highlights the common APP on the screen of the second terminal device, so that the user of the second terminal device identifies the common APP and a differentiated APP.

This facilitates data sharing between different terminal devices, and effectively improves user experience.

In addition, in the solution provided in this embodiment of this application, the icon of the common APP may be highlighted in a plurality of manners. For example, a color of the icon of the common APP may be deepened, an area of the icon of the common APP may be enlarged, and a highlighted color may be set at an edge of the icon of the common APP. This is not limited in this embodiment of this application.

In this embodiment of this application, the screen of the second terminal device may also display an interface of the first terminal device. For example, multi-screen collaboration may be performed between the first terminal device and the second terminal device. By using a multi-screen collaboration technology, the second terminal device determines the interface of the first terminal device, and displays the interface of the first terminal device on the screen of the second terminal device.

If the screen of the second terminal device displays the interface of the first terminal device, the icon of the common APP highlighted by the second terminal device includes the icon of the common APP included in the interface that is of the first terminal device and that is displayed on the screen of the second terminal device.

Further, the first terminal device sometimes needs to share data of the first terminal device with the second terminal device. For example, the first terminal device needs to transmit second target data of the second common APP installed in the first terminal device to the second terminal device. In this case, the first terminal device may transmit the second target data to the second terminal device.

Correspondingly, the solution provided in this embodiment of this application further includes the following step.

The second terminal device receives the second target data, where the second target data belongs to second data, and the second data is data that is in the second common APP in the first terminal device and that can be shared with the second terminal device.

Through this step, the second terminal device may also obtain the data of the first terminal device. In addition, after obtaining the second target data, the second terminal device may synchronize the second target to the second common APP installed in the second terminal device, so as to view and apply the second target data by using the second common APP.

Further, in a process of interaction between the first terminal device and the second terminal device, the first terminal device may also control the second terminal device.

For example, the first area on the screen of the first terminal device is used to display the interface of the second terminal device. After receiving the selection operation for the third common APP in the first area, the first terminal device may display the second selection box; and after receiving the negative operation for the second selection box, the first terminal device may transmit the first running instruction to the second terminal device.

In this case, this embodiment of this application further includes the following steps.

After receiving the first running instruction, the second terminal device runs the third common APP installed in the second terminal device, so as to meet a control requirement of the user of the first terminal device for the second terminal device.

The following are apparatus embodiments of this application, which may be used to perform the method embodiments of this application. For details not disclosed in the apparatus embodiments of this application, refer to the method embodiments of this application.

Figure 10:
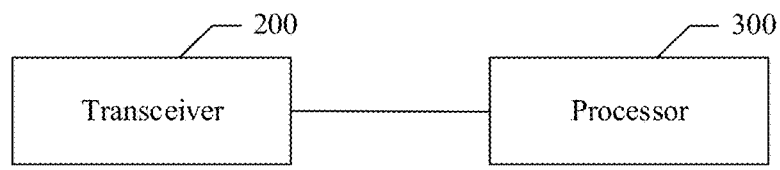
FIG. 10 is a schematic diagram of a structure of a terminal device interaction apparatus according to an embodiment of this application.

As an implementation of the foregoing embodiments, an embodiment of this application discloses a terminal device interaction apparatus, and the apparatus is applied to a first terminal device. Refer to a schematic diagram of a structure shown in FIG. 10. A terminal device interaction apparatus disclosed in this embodiment of this application includes: a transceiver interface 200 and a processor 300.

The transceiver interface 200 is configured to receive a first sharing operation for a first common application APP, where an APP installed in both the first terminal device and a second terminal device is a common APP.

The processor 300 is configured to determine a first sharing instruction based on the first sharing operation, where the first sharing instruction is used to indicate that the first terminal device needs to share data of the first common APP in the second terminal device.

The transceiver interface 200 is further configured to: transmit the first sharing instruction, and receive information about first data transmitted by the second terminal device, where the first data is data that is in the first common APP in the second terminal device and that can be shared with the first terminal device.

The processor 300 is further configured to display information about the first data.

The transceiver interface 200 is further configured to: after receiving a second sharing operation for information about first target data, transmit, by the first terminal device, a second sharing instruction, where the first target data is data in the first data, and the second sharing instruction is used to instruct to share the first target data; and receive the first target data that is transmitted by the second terminal device based on the second sharing instruction.

The first terminal device and the second terminal device may be terminal devices of a same type, or may be terminal devices of different types. This is not limited in this embodiment of this application.

In this embodiment of this application, data of an APP is usually application data of the APP, where the application data of the APP is data belonging to the APP and/or data created by the APP, and may include locally stored data and data stored in a cloud.

Embodiments of this application provide a terminal device interaction transceiver interface and a processor apparatus. The apparatus is usually applied to a first terminal device. By using the apparatus, a user only needs to perform a first sharing operation on a first common APP displayed on the first terminal device, and perform a second sharing operation on information about first data displayed on the first terminal device, so that the first terminal device obtains first target data in a second terminal device, to implement data interaction. Compared with the conventional technology, fewer operations need to be performed by the user, and the operations are simpler and more convenient, thereby correspondingly improving the data interaction efficiency.

Further, in the solution provided in this embodiment of this application, the processor is further configured to: determine a common APP in APPs installed in the apparatus, and highlight an icon of the common APP included in a screen of the apparatus.

In the solution provided in this embodiment of this application, the first sharing operation may be an operation in a plurality of forms. In a feasible implementation, the first sharing operation includes an operation for a first icon, where the first icon is an icon of the first common APP installed in the first terminal device.

Alternatively, in another feasible implementation, the screen of the first terminal device includes a first area and a second area, the first area is an area for displaying an interface of the second terminal device, the second area is an area other than the first area, the first sharing operation includes an operation for a second icon, and the second icon is an icon of the first common APP in the first area.

Further, in this embodiment of this application, the transceiver interface is further configured to receive a third sharing operation for a second common APP, where the third sharing operation is used to instruct to share data of the second common APP of the first terminal device with the second terminal device.

The processor is further configured to display information about second data of the second common APP installed in the apparatus, where the second data is data that is in the second common APP of the first terminal device and that can be shared with the second terminal device.

The transceiver interface is further configured to: after receiving a fourth sharing operation, transmit, to the second terminal device, second target data indicated by the fourth sharing operation, where the second target data belongs to the second data.

Correspondingly, this application further provides a terminal device interaction apparatus. The apparatus is applied to a second terminal device, and the apparatus includes: a transceiver interface and a processor.

The transceiver interface is configured to receive a first sharing instruction transmitted by a first terminal device, where the first sharing instruction is used to indicate that the first terminal device needs to share data of a first common APP in the second terminal device, and an APP installed in both the first terminal device and the second terminal device is a common APP.

The processor is configured to determine information about first data corresponding to the first sharing instruction, where the first data is data that is in the first common APP of the second terminal device and that can be shared with the first terminal device.

The transceiver interface is further configured to: transmit the information about the first data, receive a second sharing instruction, and transmit first target data, where the second sharing instruction indicates that the first terminal device needs to share the first target data in the first data.

Figure 2:
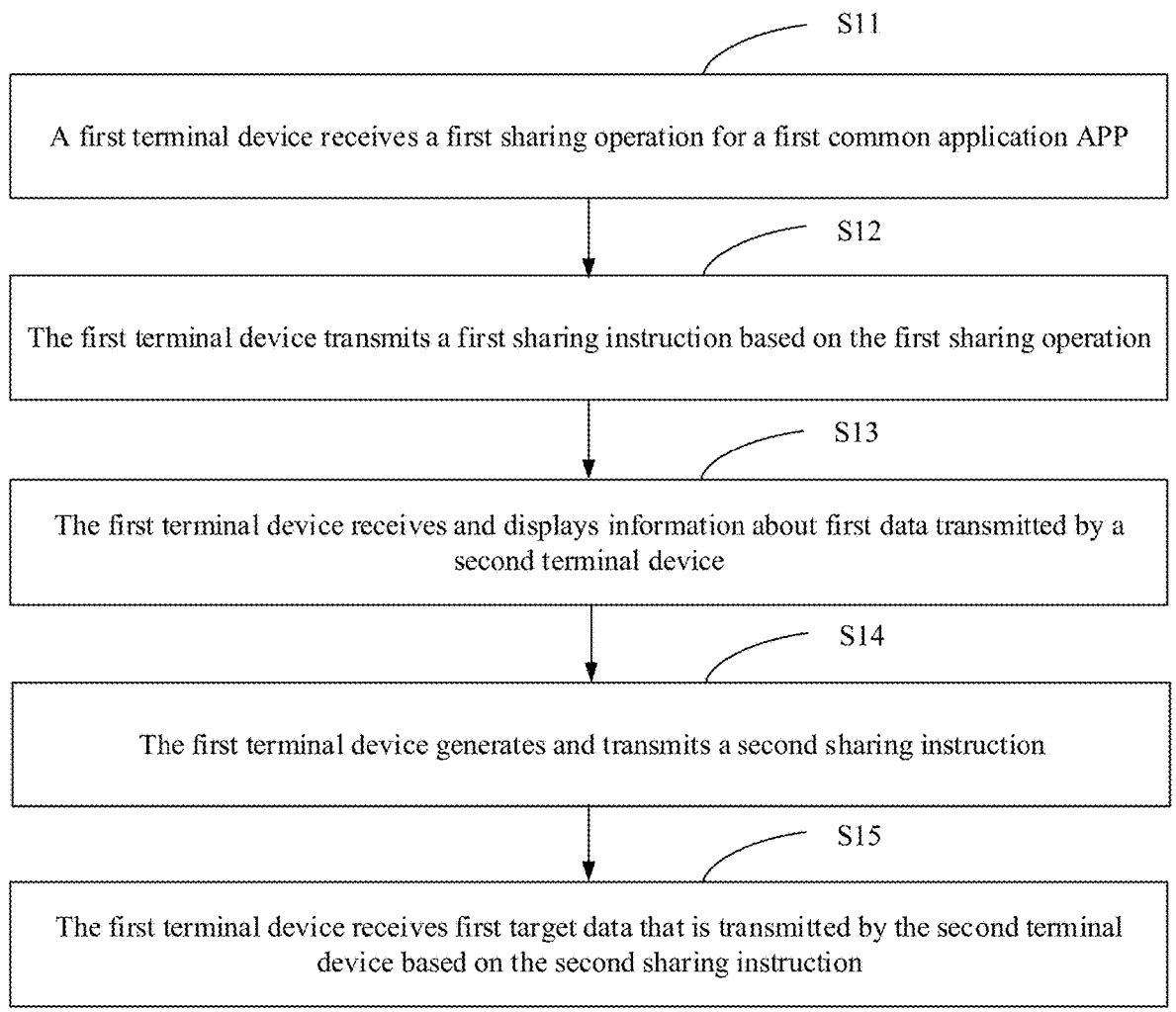
FIG. 2 is a schematic diagram of a workflow in a terminal device interaction method according to an embodiment of this application.
Figure 8:
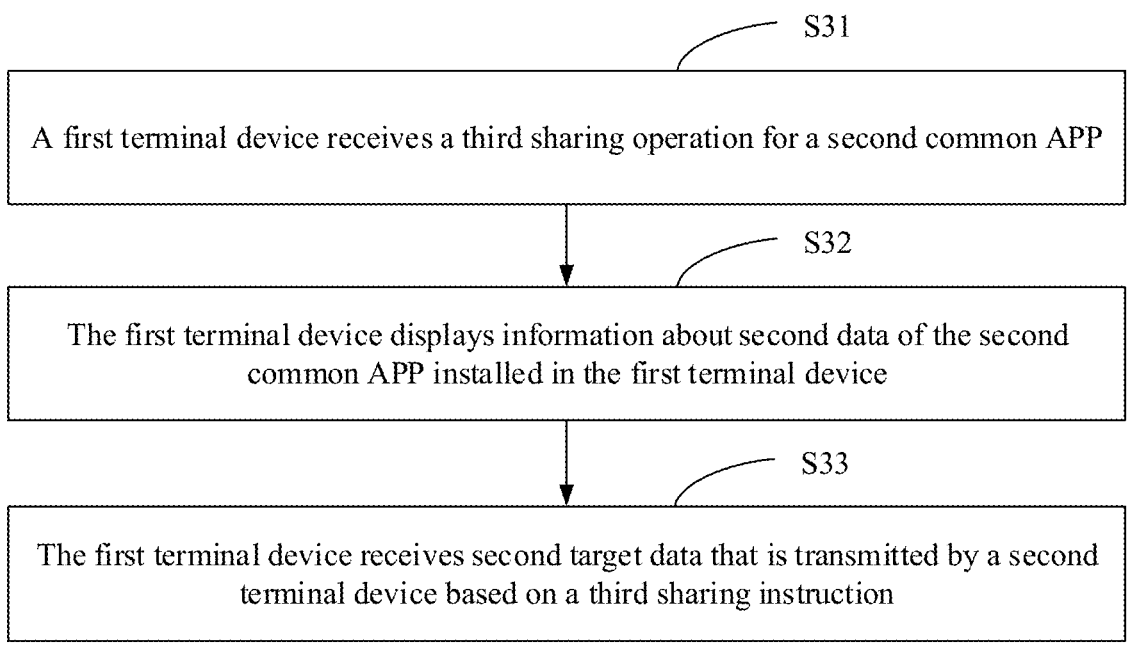
FIG. 8 is a schematic diagram of a workflow in still another terminal device interaction method according to an embodiment of this application.
Figure 11:
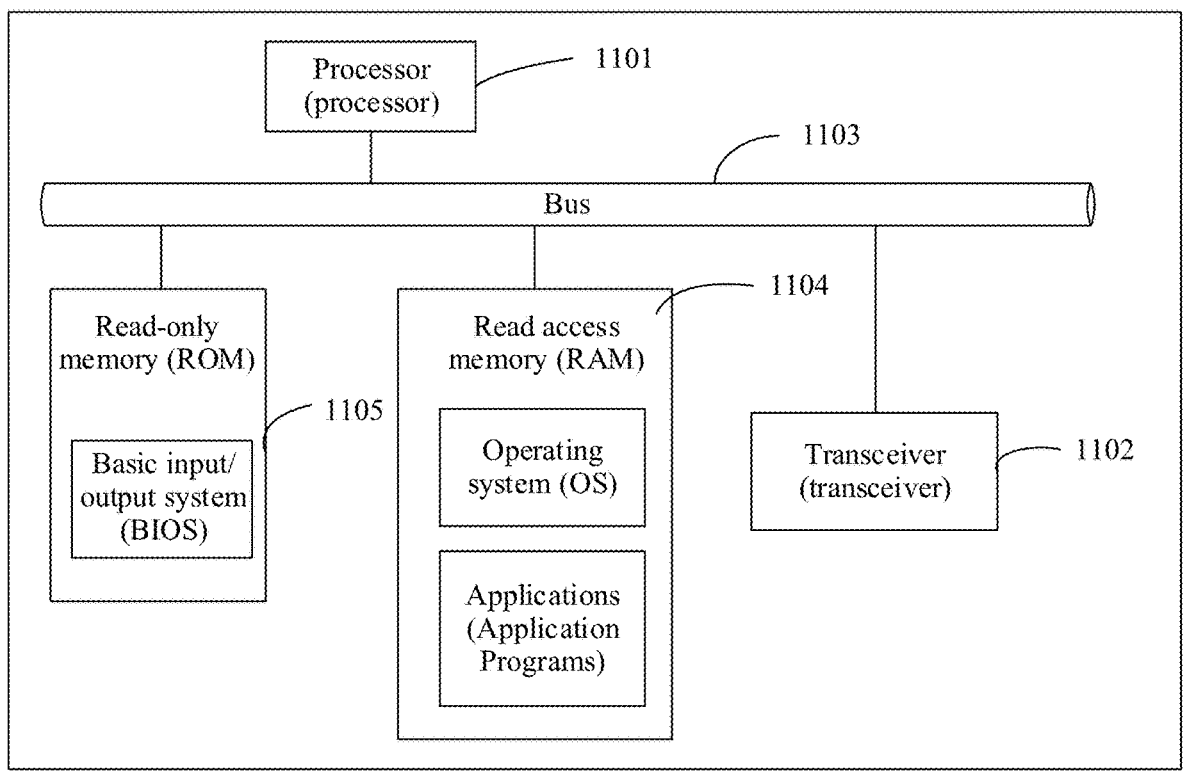
FIG. 11 is a schematic diagram of a structure of a terminal apparatus according to an embodiment of this application.

Correspondingly, corresponding to the foregoing method, an embodiment of this application further discloses a terminal apparatus. Refer to a schematic diagram of a structure shown in FIG. 11. The terminal apparatus includes:

at least one processor 1101 and a memory, where the memory is configured to store program instructions; and the processor is configured to invoke and execute the program instructions stored in the memory, so that the terminal apparatus performs all or some of the steps in the embodiments corresponding to FIG. 2, FIG. 3, and FIG. 8.

Further, the terminal apparatus may further include: a transceiver 1102 and a bus 1103; and the memory includes a random access memory 1104 and a read-only memory 1105.

The processor is separately coupled to the transceiver, the random access memory, and the read-only memory by using the bus. When the mobile terminal control apparatus needs to run, a basic input/output system built into the read-only memory or a bootloader boot system in an embedded system is used for startup, so that the apparatus enters a normal running state. After entering the normal running state, the apparatus runs an application and an operating system in the random access memory, so that the terminal apparatus performs all or some of the steps in the embodiments corresponding to FIG. 2, FIG. 3, and FIG. 8.

The apparatus in this embodiment of the present invention may correspond to the terminal device interaction apparatus in the embodiments corresponding to FIG. 2, FIG. 3, and FIG. 8. The processor and the like in the apparatus may implement functions of and/or various steps and methods implemented by the driving behavior monitoring apparatus in the embodiments corresponding to FIG. 2, FIG. 3, and FIG. 8. For brevity, details are not described herein again.

It should be noted that this embodiment may also be based on a general-purpose physical server in combination with a network device implemented by using a network function virtualization (NFV) technology. The network device is a virtual network device (for example, a virtual host, a virtual router, or a virtual switch). The virtual network device may be a virtual machine (VM) running a program used to send an advertisement packet. The virtual machine is deployed on a hardware device (for example, a physical server). The virtual machine is a complete software-simulated computer system that has complete hardware system functions and that runs in an entirely isolated environment. By reading this application, a person skilled in the art may virtualize a plurality of network devices having the foregoing functions on a general-purpose physical server. Details are not described herein again.

Figure 9:
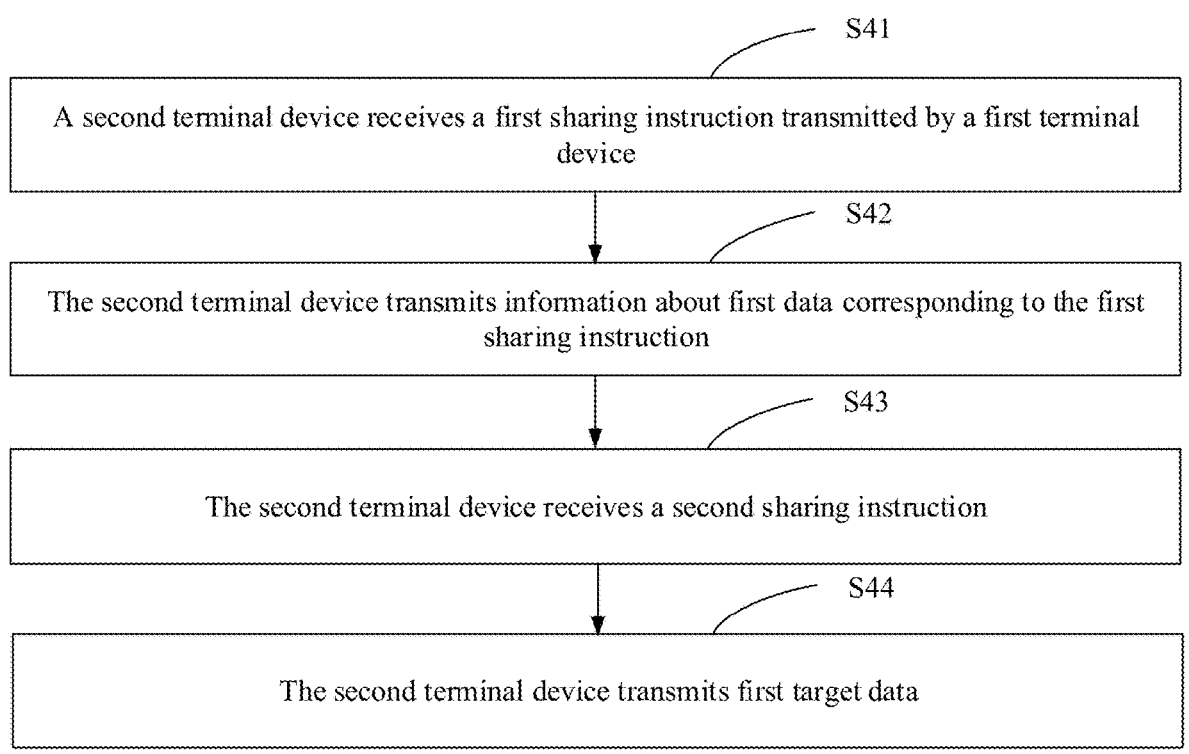
FIG. 9 is a schematic diagram of a workflow in still another terminal device interaction method according to an embodiment of this application.

Correspondingly, corresponding to the foregoing method, an embodiment of this application further discloses a terminal apparatus. The terminal apparatus includes:

at least one processor and a memory, where the memory is configured to store program instructions; and the processor is configured to invoke and execute the program instructions stored in the memory, so that the terminal apparatus performs all or some of the steps in the embodiment corresponding to FIG. 9.

Further, the terminal apparatus may further include: a transceiver and a bus; and the memory includes a random access memory and a read-only memory.

The processor is separately coupled to the transceiver, the random access memory, and the read-only memory by using the bus. When the mobile terminal control apparatus needs to run, a basic input/output system built into the read-only memory or a bootloader boot system in an embedded system is used for startup, so that the apparatus enters a normal running state. After entering the normal running state, the apparatus runs an application and an operating system in the random access memory, so that the terminal apparatus performs all or some of the steps in the embodiment corresponding to FIG. 9.

The apparatus in this embodiment of the present invention may correspond to the terminal device interaction apparatus in the embodiment corresponding to FIG. 9. The processor and the like in the apparatus may implement functions of and/or various steps and methods implemented by the driving behavior monitoring apparatus in the embodiment corresponding to FIG. 9. For brevity, details are not described herein again.

It should be noted that this embodiment may also be based on a general-purpose physical server in combination with a network device implemented by using a network function virtualization (NFV) technology. The network device is a virtual network device (for example, a virtual host, a virtual router, or a virtual switch). The virtual network device may be a virtual machine (VM) running a program used to send an advertisement packet. The virtual machine is deployed on a hardware device (for example, a physical server). The virtual machine is a complete software-simulated computer system that has complete hardware system functions and that runs in an entirely isolated environment. By reading this application, a person skilled in the art may virtualize a plurality of network devices having the foregoing functions on a general-purpose physical server. Details are not described herein again.

In specific implementation, an embodiment of this application further provides a computer-readable storage medium, where the computer-readable storage medium includes instructions. When the computer-readable medium disposed in any device runs on a computer, all or some of the steps in the embodiments corresponding to FIG. 2, FIG. 3, and FIG. 8 may be implemented. The foregoing storage medium may include: a magnetic disk, an optical disc, a read-only memory (ROM for short), or a random access memory (RAM for short), or the like.

Correspondingly, an embodiment of this application further provides a computer-readable storage medium, where the computer-readable storage medium includes instructions. When the computer-readable medium disposed in any device runs on a computer, all or some of the steps in the embodiment corresponding to FIG. 9 may be implemented. The foregoing storage medium may include: a magnetic disk, an optical disc, a read-only memory (ROM for short), or a random access memory (RAM for short), or the like.

In addition, another embodiment of this application further discloses a computer program product including instructions; and when the computer program product runs on an electronic device, the electronic device is enabled to perform all or some of the steps in the embodiments corresponding to FIG. 2, FIG. 3, and FIG. 8.

In addition, another embodiment of this application further discloses a computer program product including instructions; and when the computer program product runs on an electronic device, the electronic device is enabled to perform all or some of the steps in the embodiment corresponding to FIG. 9.

The various illustrative logical blocks, units, and circuits described in embodiments of this application may implement or operate the described functions by using a general-purpose processor, a digital information processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital information processor and a microprocessor, a plurality of microprocessors, one or more microprocessors together with a digital information processor core, or any other similar configuration.

Steps of the methods or algorithms described in embodiments of this application may be directly embedded into hardware, a software unit executed by the processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to the processor, so that the processor may read information from the storage medium and may write information to the storage medium. Optionally, the storage medium may alternatively be integrated into the processor. The processor and the storage medium may be disposed in an ASIC, and the ASIC may be disposed in a UE. Optionally, the processor and the storage medium may be disposed in different components of a UE.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or the functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a DVD), a semiconductor medium (for example, a solid-state drive Solid State Disk (SSD)), or the like.

For same or similar parts in embodiments of this specification, mutual reference may be made. Each embodiment focuses on a difference from other embodiments. Especially, apparatus and system embodiments are basically similar to the method embodiments, and therefore are described briefly. Refer to partial descriptions in the method embodiments for related parts.

A person skilled in the art may clearly understand that, the technologies in embodiments of the present invention may be implemented by software in addition to a necessary general hardware platform. Based on such an understanding, the technical solutions in embodiments of the present invention essentially or the part contributing to the conventional technology may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in embodiments or some parts of embodiments of the present invention.

The same or similar parts in embodiments of this specification can be understood by reference to each other. Especially, the road constraint determining apparatus embodiments disclosed in this application are basically similar to the method embodiments, and therefore are described briefly. For related parts, reference may be made to descriptions in the method embodiments.

The foregoing descriptions are implementations of the present invention, but are not intended to limit the protection scope of the present invention.

What is claimed is:

1. A terminal device interaction method, comprising:
obtaining, by a first terminal device, desktop layout data of a second terminal device, wherein the desktop layout data of the second terminal device indicates an installation package of a first application (APP) installed in the second terminal device; and if an operating system of the first terminal device is the same as that of the second terminal device, determining, by the first terminal device, the first APP is a first common APP based on a name of an installation package of the first common APP installed in the first terminal device and a name of the installation package of the first common APP installed in the second terminal device receiving, by the first terminal device, a first sharing operation for the first common APP installed in both the first terminal device and the second terminal device;

transmitting, by the first terminal device, a first sharing request based on the first sharing operation, wherein the first sharing request requests data sharing from the first common APP in the second terminal device;

receiving, from the second terminal device, by the first terminal device, information about first data in the first common APP in the second terminal device that can be shared with the first terminal device;

displaying, by the first terminal device, the information about the first data;

receiving a second sharing operation for information about first target data, by the first terminal device, wherein the first target data is data in the first data;

after the receiving the second sharing operation, transmitting, by the first terminal device, a second sharing request that requests the first target data to be shared with the first terminal device; and receiving, by the first terminal device, the first target data from the second terminal device based on the second sharing request.

2. The method according to claim 1, further comprising:
determining, by the first terminal device, the first common APP in APPs installed in the first terminal device; and highlighting, by the first terminal device, an icon of the first common APP comprised in a screen of the first terminal device.

3. The method according to claim 1, wherein the first sharing operation comprises an operation on a first icon, wherein the first icon is an icon of the first common APP installed in the first terminal device.

4. The method according to claim 1, wherein the first sharing operation comprises an operation on a second icon in a first area, the second icon is an icon of the first common APP, and the first area is an area displaying an interface of the second terminal device.

5. The method according to claim 4, wherein
the operation on the second icon is a drag operation on the second icon, wherein the drag operation on the second icon is used to drag the first icon to a second area.

6. The method according to claim 1, further comprising:
after receiving the first sharing operation, displaying, by the first terminal device, a first selection box, wherein the first selection box indicates whether to share the data of the second terminal device with the first terminal device; and
after receiving a confirmation operation on the first selection box, transmitting, by the first terminal device, the first sharing request.

7. The method according to claim 1, further comprising:
receiving, by the first terminal device, a third sharing operation for a second common APP, wherein the third sharing operation instructs to share data of the second common APP in the first terminal device with the second terminal device;
displaying, by the first terminal device, information about second data of the second common APP installed in the first terminal device, wherein the second data is data that is in the second common APP in the first terminal device and that can be shared with the second terminal device; and
after receiving a fourth sharing operation, transmitting, by the first terminal device to the second terminal device, second target data indicated by the fourth sharing operation, wherein the second target data belongs to the second data.

8. The method according to claim 7, wherein
the third sharing operation comprises an operation on a third icon, wherein the third icon is an icon of the second common APP installed in the first terminal device.

9. The method according to claim 8, wherein the third sharing operation is a drag operation on the third icon, and the drag operation on the third icon is used to drag the third icon to the first area, wherein the first area is an area displaying an interface of the second terminal device.

10. The method according to claim 1, further comprising:
after receiving a selection operation for a third common APP in a first area, displaying, by the first terminal device, a second selection box, wherein the second selection box indicates whether to start the third common APP installed in the first terminal device, and the first area is an area for displaying the interface of the second terminal device; and
after receiving a confirmation operation on the second selection box, running, by the first terminal device, the third common APP installed in the first terminal device.

11. The method according to claim 10, further comprising:
after receiving a negative operation on the second selection box, transmitting, by the first terminal device, a first running request to the second terminal device, wherein the first running request requests the second terminal device to run the third common APP installed in the second terminal device.

12. The method according to claim 1, further comprising:
after receiving the first target data, synchronizing, by the first terminal device, the first target data to the first common APP in the first terminal device.

13. A terminal device interaction method, comprising:
sending to a first terminal device, by a second terminal device, desktop layout data of the second terminal device, wherein the desktop layout data of the second terminal device indicates an installation package of a first common application (APP) installed in the second terminal device;
receiving, from the first terminal device, by the second terminal device, a first sharing request, wherein the first sharing request requests data sharing from the first common APP in the second terminal device, and the first common APP is installed in both the first terminal device and the second terminal device;
transmitting, by the second terminal device, information about first data corresponding to the first sharing request, wherein the first data is data that is in the first common APP in the second terminal device that can be shared with the first terminal device;
receiving, from the first terminal device, by the second terminal device, a second sharing request that requests the first target data to be shared with the first terminal device; and
transmitting, by the second terminal device, the first target data.

14. The method according to claim 13, further comprising:
determining, by the second terminal device, the first common APP in APPs installed in the second terminal device; and
highlighting, by the second terminal device, an icon of the first common APP comprised in a screen of the second terminal device.

15. The method according to claim 13, further comprising:
after receiving a first running instruction, running, by the second terminal device, a third common APP installed in the second terminal device.

16. A first terminal device, comprising:
a processor; and
a non-transitory computer readable medium which contains computer-executable instructions;
the processor is configured to execute the computer-executable instructions to enable the first terminal device to:
obtain desktop layout data of a second terminal device, wherein the desktop layout data of the second terminal device indicates an installation package of a first application (APP) installed in the second terminal device; and
if an operating system of the first terminal device is the same as that of the second terminal device, determine, by the first terminal device, the first APP is a first common APP based on a name of an installation package of the first common APP installed in the first terminal device and a name of the installation package of the first common APP installed in the second terminal device;

receive a first sharing operation for the first common APP installed in both the first terminal device and the second terminal device;

transmit a first sharing request based on the first sharing operation, wherein the first sharing request requests data sharing from the first common APP in the second terminal device;

receive, from the second terminal device information about first data in the first common APP in the second terminal device that can be shared with the first terminal device;

display the information about the first data;

receive a second sharing operation for information about first target datah, wherein the first target data is data in the first data;

after receiving the second sharing operation, transmit a second sharing request that requests the first target data to be shared with the first terminal device; and receive the first target data from the second terminal device based on the second sharing request.

17. The first terminal device according to claim 16, wherein the processor is further configured to execute the computer-executable instructions to enable the first terminal device to:

determine the first common APP in APPs installed in the first terminal device, and highlight an icon of the first common APP comprised in a screen of the first terminal device.

18. The first terminal device according to claim 16, wherein the first sharing operation comprises an operation on a first icon, wherein the first icon is an icon of the first common APP installed in the first terminal device; or the first sharing operation comprises an operation on a second icon in a first area, the second icon is an icon of the first common APP, and the first area is an area displaying an interface of the second terminal device.

19. A second terminal device, comprising:

a processor; and a non-transitory computer readable medium which contains computer-executable instructions;

the processor is configured to execute the computer-executable instructions to enable the second terminal device to:

send to a first terminal device, by the second terminal device, desktop layout data of the second terminal device, wherein the desktop layout data of the second terminal device indicates an installation package of a first common application (APP) installed in the second terminal device;

receive, from the first terminal device a first sharing request, wherein the first sharing request requests data sharing from the first common APP in the second terminal device, and the first common APP is installed in both the first terminal device and the second terminal device;

transmit information about first data corresponding to the first sharing request, wherein the first data is data that is in the first common APP in the second terminal device that can be shared with the first terminal device;

receive, from the first terminal device a second sharing request that requests the first target data to be shared with the first terminal device; and transmit the first target data.

* * * * *